US012529487B2

(12) United States Patent
Hakuta et al.

(10) Patent No.: US 12,529,487 B2
(45) Date of Patent: Jan. 20, 2026

(54) VENTILATION PATH WITH SOUNDPROOF STRUCTURE

(71) Applicant: FUJIFILM Corporation, Tokyo (JP)

(72) Inventors: Shinya Hakuta, Kanagawa (JP); Shogo Yamazoe, Kanagawa (JP); Yoshihiro Sugawara, Kanagawa (JP); Yuichiro Itai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 18/469,657

(22) Filed: Sep. 19, 2023

(65) Prior Publication Data

US 2024/0011652 A1 Jan. 11, 2024

Related U.S. Application Data

(63) Continuation of application No. PCT/JP2021/047455, filed on Dec. 22, 2021.

(30) Foreign Application Priority Data

Mar. 24, 2021 (JP) ................................ 2021-049918

(51) Int. Cl.
*F24F 7/04* (2006.01)
*G10K 11/16* (2006.01)

(52) U.S. Cl.
CPC ................ *F24F 7/04* (2013.01); *G10K 11/16* (2013.01)

(58) Field of Classification Search
CPC .................................. F24F 7/04; G01K 11/16
(Continued)

(56) References Cited

U.S. PATENT DOCUMENTS 4,432,434 A * 2/1984 Dean, Jr. ................. F16L 55/02 181/224
2002/0050418 A1* 5/2002 Jenvey ................ F24F 13/0281 181/224
(Continued)

FOREIGN PATENT DOCUMENTS

EP 3 644 308 A1 4/2020
JP 62-80142 U 5/1987
(Continued)

OTHER PUBLICATIONS

International Preliminary Report on Patentability and Written Opinion of the International Searching Authority for International Application No. PCT/JP2021/047455, dated Oct. 5, 2023, with an English translation.

(Continued)

*Primary Examiner* — Avinash A Savani
*Assistant Examiner* — Dana K Tighe
(74) *Attorney, Agent, or Firm* — Birch, Stewart, Kolasch & Birch, LLP

(57) ABSTRACT

To effectively reduce a low-frequency noise resulting from vibration of a peripheral wall of a ventilation path.
The present invention provides a ventilation path with a soundproof structure including a ventilation path that includes an open end and a soundproof structure against a sound emitted from the ventilation path. The soundproof structure includes a vibration suppression portion that is provided on a surface of a peripheral wall surrounding the ventilation path, and assuming that m and n are natural numbers of 4 or less, λ is a wavelength of a sound of which a frequency coincides with an m-th natural frequency of the peripheral wall alone, and L1 is a distance from the open end on a virtual line extending through a central position of a cross section of each portion of the ventilation path, the cross section intersecting a direction in which the ventilation (Continued)

path extends, the vibration suppression portion is present in an area at which a distance L1 is equal to or greater than (4n−3)/×λ/8 and equal to or smaller than (4n−1)×λ/8.

20 Claims, 20 Drawing Sheets

(58) Field of Classification Search
USPC .......................................................... 454/237
See application file for complete search history.

(56) References Cited

U.S. PATENT DOCUMENTS

| | | | | |
|---|---|---|---|---|
| 2017/0030610 | A1* | 2/2017 | Schaake ............... | G10K 11/172 |
| 2021/0233507 | A1* | 7/2021 | Sugawara ............ | G10K 11/172 |

FOREIGN PATENT DOCUMENTS

| | | | |
|---|---|---|---|
| JP | 3-168561 | A | 7/1991 |
| JP | 6-156054 | A | 6/1994 |
| JP | 61-75312 | U | 5/1996 |
| JP | 2005-104169 | A | 4/2005 |
| JP | 2008-291978 | A | 12/2008 |
| WO | WO 2015/152858 | A1 | 10/2015 |
| WO | WO 2018/150972 | A1 | 8/2018 |
| WO | WO 2018/235797 | A1 | 12/2018 |

OTHER PUBLICATIONS

International Search Report for International Application No. PCT/JP2021/047455, dated Mar. 8, 2022, with an English translation.
Japanese Office Action for corresponding Japanese Application No. 2023-508631, dated Jun. 24, 2025, with English translation.
Extended European Search Report for corresponding European Application No. 21933282.2, dated Jul. 3, 2024.

* cited by examiner

VENTILATION PATH WITH SOUNDPROOF STRUCTURE

CROSS-REFERENCE TO RELATED APPLICATIONS

This application is a Continuation of PCT International Application No. PCT/JP2021/047455 filed on Dec. 22, 2021, which claims priority under 35 U.S.C. § 119(a) to Japanese Patent Application No. 2021-049918 filed on Mar. 24, 2021. The above applications are hereby expressly incorporated by reference, in their entirety, into the present application.

BACKGROUND OF THE INVENTION

1. Field of the Invention

The present invention relates to a ventilation path with a soundproof structure, and more particularly relates to a ventilation path with a soundproof structure that includes the soundproof structure for suppression of an emitted sound from the ventilation path including an open end.

2. Description of the Related Art

In the case of a ventilation path such as a duct, it is desired to reduce a noise emitted from the ventilation path while allowing an air stream (wind) to flow. Examples of a ventilation path with a soundproof structure include a duct structure described in JP1994-156054 (JP-H06-156054). The duct structure is configured by mounting, to an opening portion provided in a duct main body, a flexible urethane foam sheet material of which one surface is provided with a film laminated thereon.

SUMMARY OF THE INVENTION

In the case of the above-described duct structure, the flexible urethane foam sheet material (that is, a sound absorbing material) absorbs a sound through the opening portion of the duct main body, so that a noise passing through the inside of the duct main body is reduced. However, a noise emitted from a duct is not limited to a sound passing through the inside of the duct and examples thereof include a sound generated due to vibration of a housing of the duct. Therefore, for sufficient reduction of the noise emitted from the duct, it is necessary to effectively reduce a noise resulting from vibration of the duct. Meanwhile, generally, it is difficult to reduce a noise resulting from vibration by using the sound absorbing material provided in the vicinity of the opening portion of the duct main body.

The present invention has been made in consideration of the above circumstances and an object thereof is to provide a ventilation path with a soundproof structure with which it is possible to effectively reduce a sound resulting from vibration of a peripheral wall of the ventilation path while solving the above-described problem of the related art.

In order to achieve the above-described object, the present invention has the following configurations.

[1] A ventilation path with a soundproof structure comprising a ventilation path that includes an open end and a soundproof structure against a sound emitted from the ventilation path, in which the soundproof structure includes a vibration suppression portion that is provided on a surface of a peripheral wall surrounding the ventilation path, and assuming that m and n are natural numbers of 4 or less, λ is a wavelength of a sound of which a frequency coincides with an m-th natural frequency of the peripheral wall alone, and L1 is a distance from the open end on a virtual line extending through a central position of a cross section of each portion of the ventilation path, the cross section intersecting a direction in which the ventilation path extends, the vibration suppression portion is present in an area at which a distance L1 satisfies Formula (1).

$$(4n-3)/8\times\lambda \leq L1 \leq (4n-1)/8\times\lambda \quad (1)$$

[2] The ventilation path with a soundproof structure described in [1], in which at least a portion of the vibration suppression portion is provided on a portion of the surface of the peripheral wall at which the distance L1 is $(2n-1)/4\times\lambda$.

[3] The ventilation path with a soundproof structure described in [1] or [2], in which the open end is positioned at an outlet of the ventilation path.

[4] The ventilation path with a soundproof structure described in any one of [1] to [3], in which the ventilation path is bent, assuming that L2 is a distance from the open end to a bend position of the ventilation path along the virtual line, a distance L2 is less than $5/4\times\lambda$, and the vibration suppression portion is provided upstream of the bend position of the ventilation path in a case where an upstream side is a side away from the open end.

[5] The ventilation path with a soundproof structure described in any one of [1] to [4], in which the vibration suppression portion includes a vibration damping material that is attached to the surface of the peripheral wall.

[6] The ventilation path with a soundproof structure described in any one of [1] to [5], in which the soundproof structure includes a sound absorption unit disposed between a portion of the ventilation path at which the vibration suppression portion is provided on a peripheral surface of the peripheral wall and the open end.

[7] The ventilation path with a soundproof structure described in [6], in which the ventilation path is bent, and the vibration suppression portion is provided upstream of a bend position of the ventilation path and the sound absorption unit is provided downstream of the bend position of the ventilation path in a case where an upstream side is a side away from the open end.

[8] The ventilation path with a soundproof structure described in [6] or [7], in which the sound absorption unit includes a sound absorbing material disposed at a position adjacent to the ventilation path, a surface of the sound absorbing material that faces a ventilation path side is exposed to the ventilation path, and the soundproof structure includes a covering material that covers a surface of the sound absorbing material other than the surface facing the ventilation path side.

[9] The ventilation path with a soundproof structure described in any one of [1] to [8], in which a portion of the surface of the peripheral wall at which an amount of displacement is largest in a case of vibration at the m-th natural frequency of the peripheral wall alone is provided with the vibration suppression portion.

[10] The ventilation path with a soundproof structure described in [9], in which the m-th natural frequency of the peripheral wall alone is a first natural frequency of the peripheral wall alone.

[11] The ventilation path with a soundproof structure described in [9] or [10], in which, in a case where a plurality of natural numbers correspond to the natural number m, the area at which the distance L1 satisfies Formula (1) is determined for each of the plurality of natural numbers, and the vibration suppression portion is provided in each of the areas respectively determined for the plurality of natural numbers.

[12] The ventilation path with a soundproof structure described in any one of [1] to [11], in which, assuming that fa is the m-th natural frequency of the peripheral wall alone and fb is the m-th natural frequency of the peripheral wall with the vibration suppression portion provided on the surface, Formula (2) is satisfied.

$$0.8 \leq fa/fb \leq 1.25 \quad (2)$$

[13] The ventilation path with a soundproof structure described in any one of [1] to [12], in which the vibration suppression portion is attached to a portion of an outer peripheral surface of the peripheral wall.

[14] The ventilation path with a soundproof structure described in [13], in which the vibration suppression portion is a laminate of two or more layers including a layer consisting of a vibration damping material and a layer consisting of a blocking plate against vibration.

[15] The ventilation path with a soundproof structure described in any one of [1] to [14], in which the vibration suppression portion is a laminate of two layers, and the laminate includes a first layer consisting of a metal plate and a second layer including a pressure-sensitive adhesive and a vibration damping material, and is attached to the surface of the peripheral wall via the second layer.

According to the present invention, a ventilation path with a soundproof structure with which it is possible to effectively reduce a noise resulting from vibration of a peripheral wall of a ventilation path is realized.

DESCRIPTION OF THE PREFERRED EMBODIMENTS

Figure 1:
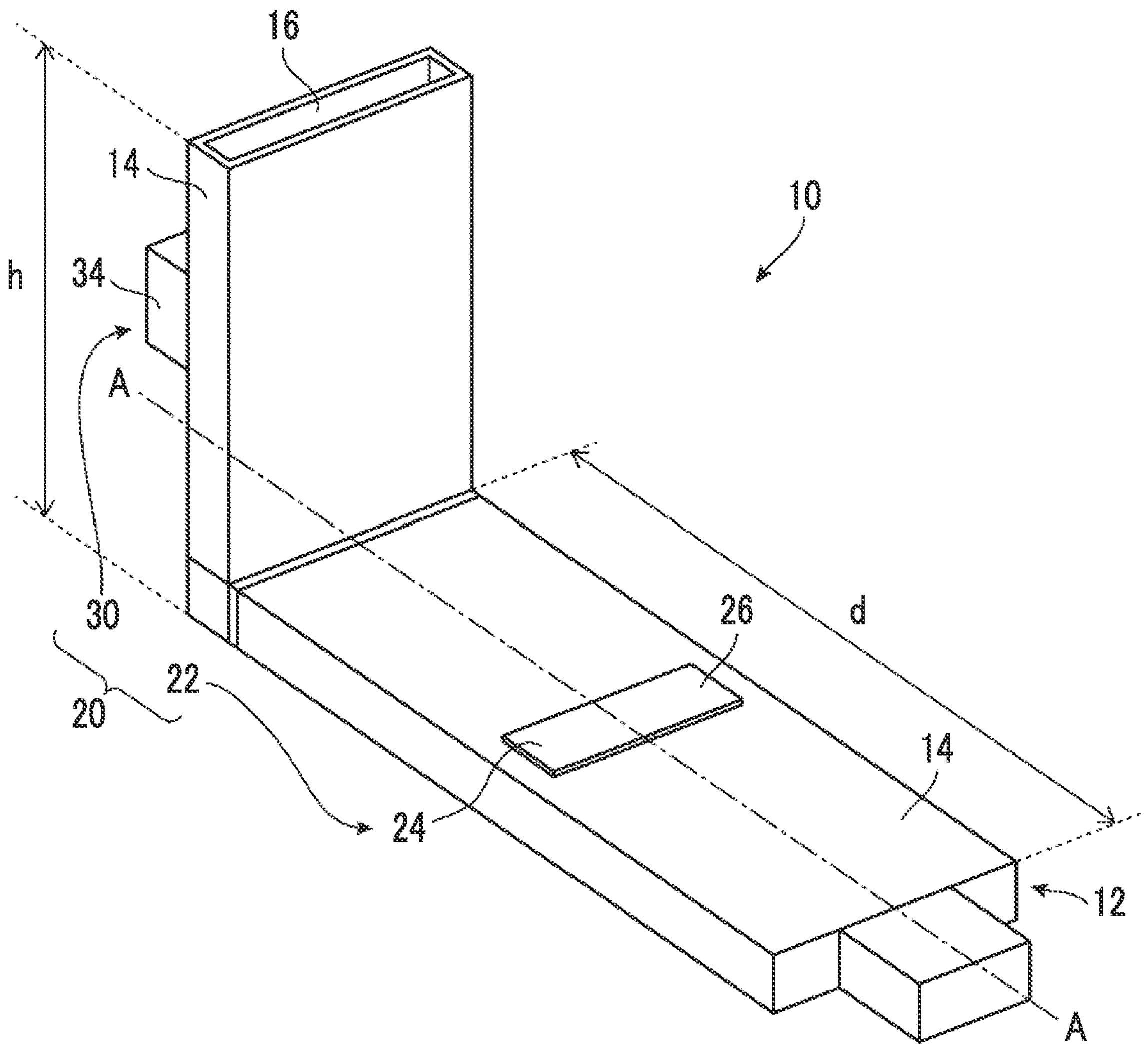
FIG. 1 is a perspective view showing a ventilation path with a soundproof structure according to an embodiment of the present invention.

Hereinafter, a ventilation path with a soundproof structure according to an embodiment of the present invention will be described below in detail with reference to a preferred embodiment shown in the accompanying drawings.

It should be noted that an embodiment described below is a merely example for facilitating the understanding of the present invention, and does not limit the present invention. That is, regarding the present invention, there may be modification or improvement of the embodiment described below without departing from the gist thereof.

In addition, the material, the shape, or the like of each member used to implement the present invention can be set in any manner in accordance with the purpose of use of the present invention and the technical level at the time of implementation of the present invention.

Moreover, the present invention includes an equivalent thereof.

In addition, in the present specification, a numerical range represented using "to" means a range including numerical values described before and after the preposition "to" as a lower limit value and an upper limit value.

In addition, in the present specification, "orthogonal" and "parallel" include a range of errors accepted in the technical field to which the present invention belongs. For example, "being orthogonal" or "being parallel" means being in a range of less than ±10° or the like with respect to being orthogonal in the strict sense or being parallel in the strict sense. Note that the error with respect to being orthogonal in the strict sense or being parallel in the strict sense is preferably 5° or less, and more preferably 3° or less.

In addition, in the present specification, the meanings of "the same", "identical" and "equal" may include a range of errors generally accepted in the technical field to which the present invention belongs.

In addition, in the present specification, the meanings of "entire", "all", and "entire surface" may include a range of errors generally accepted in the technical field to which the present invention belongs in addition to a case of being 100% and for example, the meanings thereof may include a case of being 99% or more, 95% or more, or 90% or more.

In addition, "soundproof" in the present invention is a concept including both of sound insulation and sound absorption. The sound insulation means to block a sound, in other words, to prevent transmission of a sound. The sound absorption means to reduce a reflected sound and means to absorb a sound (acoustic) in easy terms.

In addition, "vibration damping" in the present invention means to suppress vibration of a vibration damping target device and specifically means to reduce or attenuate vibration by means of absorption of vibration energy.

[About Configuration Example of Ventilation Path with Soundproof Structure According to Embodiment of Present Invention]

A configuration of a ventilation path 10 with a soundproof structure according to the embodiment (hereinafter, the present embodiment) of the present invention will be described with reference to FIGS. 1 to 4.

Figure 2:
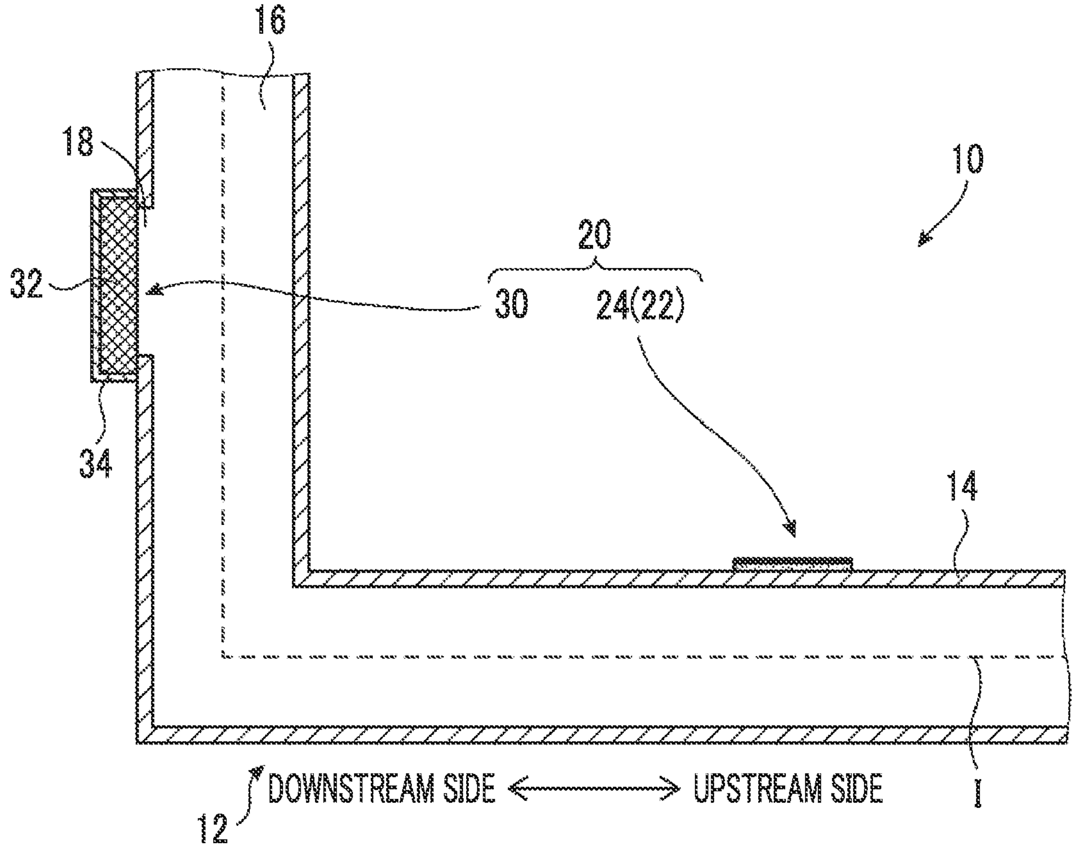
FIG. 2 is a cross-sectional view taken along line A-A of FIG. 1.

As shown in FIGS. 1 and 2, the ventilation path 10 with a soundproof structure according to the present embodiment includes a ventilation path 12 in which an air stream (wind) flows, and a soundproof structure 20 for a sound emitted from the ventilation path 12.

(Ventilation Path)

The ventilation path 12 is, for example, a duct for air conditioning, and is surrounded (specifically, four sides thereof is surrounded) by a peripheral wall 14 constituting a housing of the duct. The purpose of use of the ventilation path 12 is not particularly limited, and may be, for example, air conditioning in a building, air cooling in an electric device, or air conditioning in a vehicle such as an automobile or an aircraft.

As shown in FIG. 1, the ventilation path 12 includes an open end 16 provided at an outlet thereof (that is, a gas outlet). The open end 16 is a portion where the ventilation path 12 is connected to the outside (an external space) of the ventilation path 12. The shape (the opening shape) of the open end 16 is, for example, a rectangular shape, specifically, an oblong shape. However, the shape of the open end 16 is not particularly limited and may be a circular shape, an oval shape, a quadrangular shape other than an oblong shape, a polygonal shape other than a quadrangular shape, or an indefinite shape.

An end of the ventilation path 12 that is on an upstream side is connected to a blower or a fan (not shown). Here, the upstream side is an upstream side in a direction in which a gas (wind) flows in the ventilation path 12. That is, the upstream side is a side away from the open end 16.

The ventilation path 12 according to the present embodiment is bent in an L-like shape as shown in FIGS. 1 and 2 from the viewpoint of size reduction and space saving. That is, a direction in which the ventilation path 12 extends changes by approximately 90 degrees at an intermediate position thereof. Here, the direction in which the ventilation path 12 extends corresponds to a direction in which a virtual line I, which will be described later, extends.

An angle at which the ventilation path 12 is bent is not particularly limited and may be less than 90 degrees or greater than 90 degrees. In addition, the ventilation path 12 may extend straight without being bent.

The peripheral wall 14 of the ventilation path 12 is a polygonal tube. In other words, the shape of a cross section (in the strict sense, a cross section orthogonal to the direction in which the ventilation path 12 extends) of each portion of the ventilation path 12 is a rectangular shape, specifically, an oblong shape. However, the cross-sectional shape of each portion of the ventilation path 12 is not particularly limited and may be a circular shape, an oval shape, a quadrangular shape other than an oblong shape, a polygonal shape other than a quadrangular shape, or an indefinite shape. In addition, in the present embodiment, surfaces (outer peripheral surfaces) of the peripheral wall 14 are flat surfaces, more specifically, rectangular flat surfaces. However, the present invention is not limited thereto, and the surfaces of the peripheral wall 14 may be curved surfaces.

In the present embodiment, the peripheral wall 14 is made of a relatively lightweight material, and specifically, is made of a relatively thin plate material. Examples of the material of the peripheral wall 14 include a metal material, a resin material, a reinforced plastic material, and a carbon fiber.

Examples of the metal material include aluminum, titanium, magnesium, tungsten, iron, steel, chromium, chromium molybdenum, nichrome-molybdenum, copper, and alloys such as steel galvanized cold commercial (SGCC).

Examples of the resin material include acrylic resin, polymethyl methacrylate, polycarbonate, polyamide, polyalylate, polyetherimide, polyacetal, polyetheretherketone, polyphenylene sulfide, polysulfone, polyethylene terephthalate, polybutylene terephthalate, polyimide, ABS resin (copolymer synthetic resin of acrylonitrile, flame-retardant ABS resin, butadiene, and styrene), polypropylene, triacetylcellulose (TAC), polypropylene (PP), polyethylene (PE), polystyrene (PS), acrylate sthrene acrylonitrile (ASA) resin, polyvinyl chloride (PVC) resin, and polylactic acid (PLA) resin.

Examples of the reinforced plastic material include carbon fiber reinforced plastics (CFRP) and glass fiber reinforced plastics (GFRP).

In addition, examples of the material of the peripheral wall 14 include natural rubber, chloroprene rubber, butyl rubber, ethylene propylene diene rubber (EPDM), silicone rubber, and the like, and rubbers having a crosslinking structure thereof.

The peripheral wall 14 is generally composed of a plurality of plate materials arranged along the direction in which the ventilation path 12 extends, and the entire peripheral wall 14 is configured by joining plate materials adjacent to each other. Note that the entire peripheral wall 14 may be composed of the same material. Alternatively, a portion of the peripheral wall 14 (for example, a portion positioned downstream of a bend position) may be made of a material different from the material of another portion, or the same type of material different in thickness.

(Soundproof Structure)

The soundproof structure 20 is provided to reduce the volume of a sound radiated from the entire ventilation path 12. In the present embodiment, the peripheral wall 14 of the ventilation path 12 is composed of a thin plate formed of plastic or metal for weight reduction and thus a sound radiated from the ventilation path 12 includes a sound attributable to vibration of the peripheral wall 14. In the present embodiment, the soundproof structure 20 has a configuration in which not only a sound emitted from the outlet (that is, the open end 16) of the ventilation path 12 is suppressed but also a noise attributable to the vibration of the peripheral wall 14 is suppressed. Specifically, as shown in FIGS. 1 and 2, the soundproof structure 20 includes a vibration suppression portion 22 that suppresses the vibration of the peripheral wall 14, and a sound absorption unit 30 that absorbs a sound passing through the inside of the ventilation path 12.

<Vibration Suppression Portion>

Figure 3:
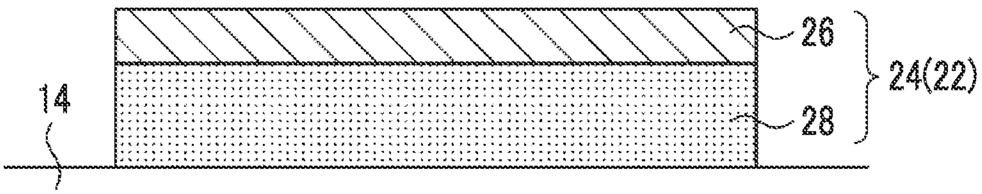
FIG. 3 is a cross-sectional view of a vibration suppression portion according to the embodiment of the present invention.

The vibration suppression portion 22 is provided to suppress the vibration of the peripheral wall 14 and to suppress a sound attributable to the vibration (that is, a noise emitted from the peripheral wall 14). The vibration suppression portion 22 is provided on a surface of the peripheral wall 14 and includes a vibration damping material 24 attached to the surface of the peripheral wall 14. The vibration damping material 24 is a laminate of two or more layers, and in the present embodiment, the vibration damping material 24 is a laminate of two layers as shown in FIG. 3. The vibration damping material 24 includes a first layer 26 consisting of a metal plate and a second layer 28 including a pressure-sensitive adhesive and a vibration damping material, and is attached to the surface of the peripheral wall 14 via the second layer 28 having adhesiveness. In the strict sense, the vibration damping material 24 is bonded to the surface of the peripheral wall 14.

The first layer 26 is a plate layer of having a relatively high hardness and, specifically, the first layer 26 consists of a blocking plate against vibration and blocks (specifically, reflects) the vibration of the peripheral wall 14 and a sound transmitted through the peripheral wall 14. Assuming that Y and t are the young's modulus and the thickness of a plate material constituting the first layer 26, respectively, the hardness of the first layer 26 is represented by $Y \times t^3$. It is desirable that a layer constituting the first layer 26 is formed of metal since it is possible to achieve a large young's modulus and a small thickness in a case where the layer is formed of metal. Examples of the metal include aluminum, steel galvanized cold commercial (SGCC), a steel plate, and copper. Further, the plate material constituting the first layer 26 is not limited to a metal plate and may be a polycarbonate plate or an acrylic plate.

The second layer 28 is a layer consisting of a pressure-sensitive adhesive and a vibration damping material and since a tan $\sigma$ value, which is an index of viscoelasticity, is relatively high, vibration of the peripheral wall 14 can be absorbed. As the vibration damping material constituting the second layer 28, a rubber-based material, a resin-based material, a urethane-based material, or the like can be used and specific examples thereof include a butyl-based polymer, a chlorinated polyethylene-based polymer, and an acrylic polymer.

The laminate constituting the vibration damping material 24 is not limited to a laminate of two layers, and may be a laminate of three or more layers.

As the vibration damping material 24 configured as described above, a restraint type vibration damping material can be used and specific examples thereof include Calmoon sheet manufactured by Sekisui Chemical Co., Ltd., LEGETOLEX manufactured by NITTO DENKO CORPORATION, RICOCALM manufactured by RISHO KOGYO Co., Ltd., Hayadamper manufactured by HAYAKAWA RUBBER Co., Ltd., and EDM1000 manufactured by 3M Company.

Note that the vibration damping material 24 is not limited to a restraint type vibration damping material and may be a non-restraint type vibration damping material. In addition, the vibration damping material 24 may be a single-layer vibration damping material and, for example, may consist of vibration damping rubber. As the vibration damping material consisting of the vibration damping rubber, for example, NonBurenSheet NS or the like manufactured by Hirakata Giken, Inc. can be used. In addition, the vibration damping material 24 may be attached to the surface of the peripheral wall 14 by being bonded thereto or may be simply placed on the surface of the peripheral wall 14.

Figure 4:
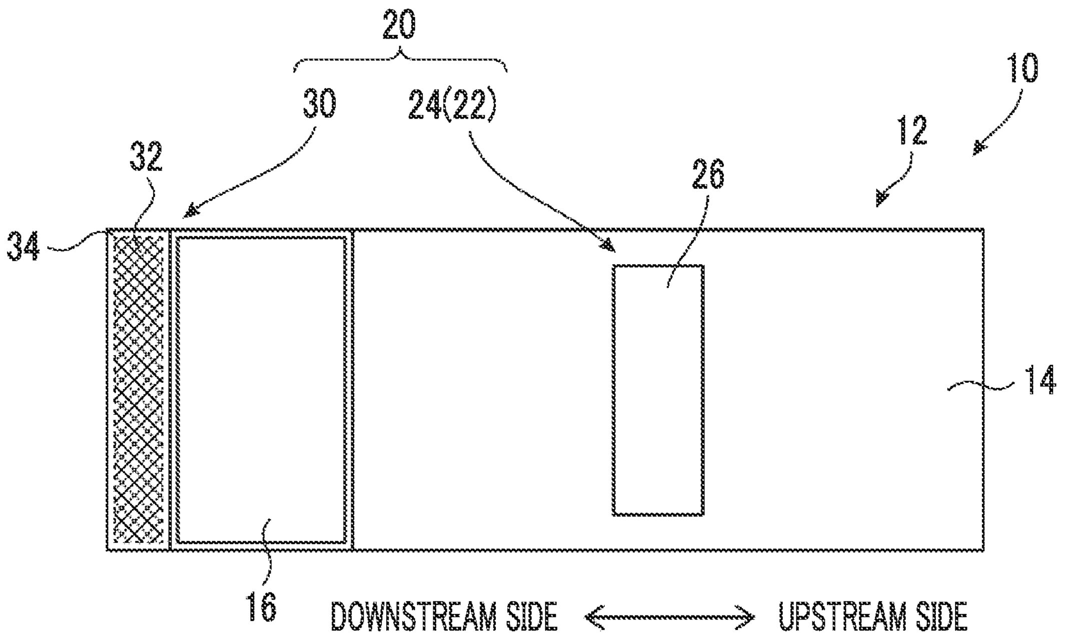
FIG. 4 is a plan view showing a surface of a peripheral wall provided with the vibration suppression portion.

The vibration damping material 24 is attached to the surface (in the strict sense, the outer peripheral surface) of the peripheral wall 14 having a polygonal tubular shape. Specifically, as shown in FIGS. 2 and 4, the vibration damping material 24 is attached to an outer peripheral surface of a portion (for example, an upper side portion) constituting one of four sides of a cross section of the peripheral wall 14. As shown in FIG. 4, the outer shape of the vibration damping material 24 is rectangular, more specifically, oblong as seen in a plan view. The outer shape of the vibration damping material 24 is not limited to a rectangular (oblong) shape. However, from the viewpoint of easy cutting, it is preferable that the outer shape thereof is a simple shape (specifically, a quadrangular shape including a rectangular (oblong and square) shape, a circular shape, an oval shape, a polygonal shape other than a quadrangular shape, or the like).

In addition, the vibration damping material 24 is attached to a portion of the outer peripheral surface of the peripheral wall 14. Specifically, as shown in FIG. 4, at the peripheral wall 14, the vibration damping material 24 is attached only to a portion of a surface of a plate material to which the vibration damping material 24 is attached (hereinafter, referred to as a plate material surface). The plate material to which the vibration damping material 24 is attached is a portion that constitutes the one of the four sides of the cross section of the peripheral wall 14. Here, assuming that S1 is the area of attachment of the vibration damping material 24 and S0 is the area of the plate material surface, $S1/S0 \times 100$ (%) is preferably 25% or more and 50% or less. Such a numerical range is determined in consideration of fluctuations in frequency (natural frequency) of the vibration of the peripheral wall 14 caused by attachment of the vibration damping material 24 while ensuring the vibration damping effect of the vibration damping material 24 (refer to Example 7 and Example 8 which will be described later).

In the present embodiment, the vibration damping material 24 is attached to the outer peripheral surface of the peripheral wall 14 as described above from the viewpoint of easy attachment of the vibration damping material 24. However, the present invention is not limited thereto and the vibration damping material 24 may be attached to an inner peripheral surface of the peripheral wall 14.

Figure 5:
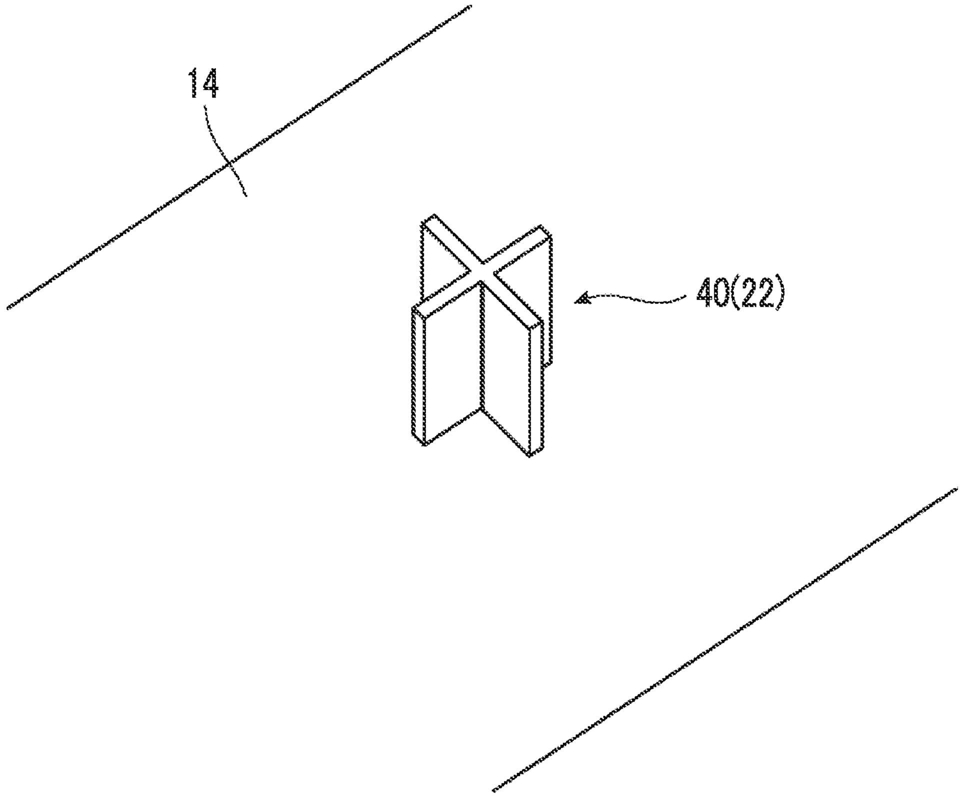
FIG. 5 is a view showing a modification example of the vibration suppression portion.

In the present embodiment, the vibration damping material 24 is provided as an example of the vibration suppression portion 22. However, a structure other than the vibration damping material 24 may also be used as long as the structure suppresses vibration of the peripheral wall 14 in a case where the structure is provided on the surface of the peripheral wall 14. For example, as shown in FIG. 5, a rib 40 protruding from the surface of the peripheral wall 14 may be used as the vibration suppression portion 22. That is, it is possible to reduce a sound attributable to vibration by providing the rib 40 to increase the stiffness of the peripheral wall 14 in the vicinity of the rib 40 and to suppress the vibration of the peripheral wall 14.

In addition, suppressing the vibration of the peripheral wall 14 by bending the peripheral wall 14 to provide a bent portion or by providing a linear bulge portion by means of weld bead processing to increase the stiffness locally may also be adopted. In this case, the bent portion or the bulge portion on a bead corresponds to the vibration suppression portion 22.

The inventor of the present invention has found that a position on the surface of the peripheral wall 14 at which the vibration suppression portion 22 is provided, specifically, the position of attachment of the vibration damping material 24 influences the amount of vibration damping with respect to vibration of the peripheral wall 14. As a result, in the present embodiment, the vibration suppression portion 22 is provided within a predetermined area on the surface of the peripheral wall 14 so that a noise attributable to the vibration of the peripheral wall 14 is effectively reduced.

Specifically, assuming that L1 is a distance from the open end 16 on the virtual line I extending through the center of the ventilation path 12, the vibration suppression portion 22 is provided within an area where a distance L1 satisfies Formula (1) as follows.

$$(4n-3)/8\times\lambda\leq L1\leq(4n-1)/8\times\lambda \quad (1)$$

Here, n is a natural number of 4 or less.

The virtual line I is a line that extends through the central position of a cross section (a cross section that intersects the direction in which the ventilation path 12 extends) of each portion of the ventilation path 12, and the virtual line I corresponds to a central axis of the ventilation path 12. In a case where the shape of a cross section is a circle, the central position of the cross section is the center of the circle and in a case where the shape of the cross section is a polygonal shape including a triangular shape and a quadrangular shape, the central position of the cross section is a position separated from the vertexes of the polygonal shape by the same distance (in other words, the center of a circumscribed circle).

In the following description, in a case where the term "distance" is used alone, the term refers to a distance from the open end 16 on the virtual line I unless otherwise specified.

In above Formula (1), λ is the wavelength of a sound having a frequency coinciding with an m-th (m is a natural number) natural frequency fa of the peripheral wall 14 alone, and the value thereof is calculated by substituting the natural frequency fa and a sound velocity c0 into the following formula.

$$\lambda=c0/fa$$

Note that, in the present embodiment, the above-described wavelength λ is large with respect to the open end 16 of the ventilation path 12, and specifically, is larger than two times the equivalent circle diameter of the open end 16.

The m-th natural frequency fa of the peripheral wall 14 alone is the m-th natural frequency of the peripheral wall 14 without the vibration suppression portion 22. Here, m is a natural number of 4 or less, and in the present embodiment, m=1. That is, the natural frequency fa is the first natural frequency of the peripheral wall 14 alone, and the wavelength λ of Formula (1) is the wavelength of a sound having a frequency coinciding with the first natural frequency thereof. Note that the natural frequency fa is determined by the size, the thickness, the material, the fixation method, and the like of a portion (a plate material) of the peripheral wall 14 on which the vibration suppression portion 22 is provided.

In the present embodiment, the vibration suppression portion 22 is present on the surface of the peripheral wall 14 within an area where the distance L1 satisfies Formula (1). Specifically, the vibration damping material 24 is attached to the outer peripheral surface of the peripheral wall 14 within the above-described area.

Incidentally, the expression "the vibration suppression portion 22 is present within an area where the distance L1 satisfies Formula (1)" means that a portion of the vibration suppression portion 22 or the entire vibration suppression portion 22 is positioned within an area where the distance L1 satisfies Formula (1) in the direction in which the ventilation path 12 extends (in other words, the direction in which the ventilation path 12 extends on the virtual line I).

The number of vibration suppression portions 22 (specifically, the number of vibration damping materials 24, ribs 40, or the like) provided within the area where the distance L1 satisfies Formula (1) is not particularly limited and only one vibration suppression portion 22 may be provided within the above-described area. Alternatively, two or more vibration suppression portions 22 may be provided within the above-described area.

The reason why a sound resulting from the vibration of the peripheral wall 14 can be effectively reduced in a case where the vibration suppression portion 22 is present in the area where the distance L1 satisfies Formula (1) will be described below.

At the open end 16 of the ventilation path 12, a change in acoustic impedance is large and the degree of such a change is large. For this reason, a sound is reflected in the vicinity of the open end 16, and the degree of reflection increases as the frequency of the sound becomes low. Meanwhile, a high-frequency sound easily passes through the open end 16. Note that reflection of a sound at the open end 16 may occur in a case where the wavelength λ of the sound is larger than two times the equivalent circle diameter of the open end 16 (in other words, in the case of a low-frequency sound).

At the open end 16, the phase of a sound changes due to reflection, and due to the change in phase, an opening end portion (in the strict sense, a position on the outside that is separated from the open end 16 by a distance corresponding to open end correction) becomes a sound pressure node (in other words, a local particle velocity antinode). That is, a sound (an incident wave) from an upstream side of the ventilation path 12 to the open end 16 and a sound (a reflected wave) reflected at the open end 16 interfere with each other and thus an acoustic mode (a standing wave) is formed in the vicinity of the open end 16 of the ventilation path 12.

Since the acoustic mode is formed, a stress acts on each portion of the peripheral wall 14 of the ventilation path 12. The way in which the stress is distributed coincides with the way in which the sound pressure is distributed in the ventilation path 12. That is, the stress acting on the peripheral wall 14 is large at the position of an antinode where the sound pressure becomes high in the ventilation path 12 and the peripheral wall 14 is likely to vibrate at such a position.

On the other hand, since the opening end portion is a position where the local particle velocity is maximized and corresponds to a sound pressure node, the vibration of the peripheral wall 14 is small at that position. Therefore, a position slightly separated from the opening end portion (specifically, a position separated from the open end 16 by a distance corresponding to approximately (2n−1)/4×λ) becomes a sound pressure antinode. At such a position, the degree of vibration of the peripheral wall 14 is likely to be large, and a radiated sound attributable to the vibration is likely to be large.

Incidentally, the degree of sound interference decreases away from the open end 16 due to the influence of absorption in the ventilation path 12 and sound radiation caused by vibration, sound wave coherence corruption, or the like. Therefore, vibration is more likely to occur at a position where the natural number n is smallest among positions that become sound pressure antinodes (that is, positions where the distance is (2n−1)/4×λ).

Meanwhile, there are few cases where the peripheral wall 14 is composed of a single plate material, and in many cases, the peripheral wall 14 is configured by arranging a plurality of plate materials. In addition, there is a case where the thickness of a plate material (a beam or the like) constituting the peripheral wall 14 is made large or a plate material supporting mechanism is provided for stiffness improvement or the like. A portion of the peripheral wall 14 that has a large plate thickness and a portion of the peripheral wall 14 that is provided with the supporting mechanism serve as fixation ends at the time of vibration.

Particularly, regarding the ventilation path 12 with a bend as in the present embodiment, there is a case where a plate thickness at a bend position is made large or a plate material is bent at the bend position. Therefore, on an upstream side and a downstream side with respect to the bend position, the plate materials constituting the peripheral wall 14 become vibration plates independent of each other. In addition, the amount of vibration (the amount of displacement) becomes large at the natural frequency of each of the vibration plates on the upstream side and the downstream side that are independent of each other.

Due to the coupling of the above-described acoustic mode and the behavior (the vibration) of the vibration plates of the peripheral wall 14, a low-frequency sound is reflected in the vicinity of the open end 16 and thus an acoustic mode is likely to be formed. As a result, the peripheral wall 14 Is likely to vibrate.

Since formation of the acoustic mode does not depend on whether or not the ventilation path 12 is bent, the acoustic mode is formed even in the ventilation path 12 with no bend. In addition, even in the case of the ventilation path 12 with no bend, the amount of vibration is likely to become large at a position at which the distance from the open end 16 is approximately (2n−1)/4×λ, (that is, at a sound pressure antinode).

Based on the description made above, in the present embodiment, positions that are offset by λ/8 from a position at which the distance from the open end 16 is (2n−1)/4×λ, while being positioned upstream and downstream of the position are specified (that is, a position at which the distance is (4n−3)/8×λ, and a position at which the distance is (4n−1)/8×λ, are specified). Then, the vibration suppression portion 22 is provided on the surface of the peripheral wall 14 such that the vibration suppression portion 22 is present within an area between the two specified positions (that is, within an area where the distance L1 satisfies Formula (1)). Accordingly, it is possible to achieve effective suppression of vibration of the peripheral wall 14 and effective reduction of a low-frequency sound resulting from vibration.

In addition, it is preferable that at least a portion of the vibration suppression portion 22 (in the strict sense, the vibration damping material 24) is provided on a portion of the surface of the peripheral wall 14 at which the distance L1 is (2n−1)×λ/4. This is because the above-described portion corresponds to the position of the sound pressure antinode in the acoustic mode.

In addition, in the present embodiment, the ventilation path 12 is bent at a position at which a distance from the open end 16 is smaller than 5/4×λ. In other words, assuming that L2 is a distance from the open end 16 to the bend position of the ventilation path 12 along the virtual line I, a distance L2 is smaller than 5/4×λ. Here, the bend position of the ventilation path 12 coincides with a position where the virtual line I is bent.

In addition, in the present embodiment, as shown in FIGS. 1 and 2, the vibration suppression portion 22 is provided upstream of the bend position of the ventilation path 12. Particularly, in the present embodiment, the distance L2 is smaller than ¼×λ, and the sound pressure antinode in the acoustic mode is positioned upstream of the bend position. Therefore, since the peripheral wall 14 is likely to vibrate on an upstream side with respect to the bend position, vibration of the peripheral wall 14 can be more effectively suppressed with the vibration suppression portion 22 provided upstream of the bend position. As a result, a low-frequency sound resulting from the vibration of the peripheral wall 14 can be suppressed more effectively.

From the viewpoint of more effectively suppressing the vibration of the peripheral wall 14, it is preferable that the vibration suppression portion 22 is provided on a portion of the surface of the peripheral wall 14 at which the amount of displacement is largest. Here, the portion where the amount of displacement is largest is a portion of the surface of the peripheral wall 14 at which the amount of displacement (the amount of vibration (the amplitude at the time of vibration in easy terms)) is largest in a case where the peripheral wall 14 vibrates at the m-th natural frequency (for example, the first natural frequency) of the peripheral wall 14 alone. Note that the natural frequency and the amplitude at the time of vibration of each peripheral wall 14 can be obtained by a measurement test in which various natural vibration analysis methods (for example, modal analysis in which an impulse hammer is used for excitation and the amplitude at each position is measured by means of a displacement meter) or natural frequency calculation of structural mechanics calculation in which a finite element method or the like is used.

In addition, although the natural frequency of the peripheral wall 14 is changed since the vibration suppression portion 22 is provided on the surface thereof, it is preferable that the amount of change in natural frequency falls within a certain range. For example, assuming that fb is the m-th natural frequency of the peripheral wall 14 with the vibration suppression portion 22 provided on the surface thereof, it is preferable that a natural frequency fb satisfies Formula (2) as follows in a relationship between the natural frequency fb and the m-th natural frequency fa of the peripheral wall 14 alone.

$$0.8 \leq fa/fb \leq 1.25 \tag{2}$$

The numerical range shown in Formula (2) corresponds to a condition on which the natural frequency transitions into an adjacent band in one-third octave band evaluation. From the viewpoint of soundproofing, it is not desirable that the natural frequency transitions into the adjacent band since the transition results in easy detection of a change in sound quality.

In addition, in the above-described embodiment, m=1. That is, the wavelength λ is calculated from the first natural frequency of the peripheral wall 14 alone, the range of the distance L1 is derived from the calculated wavelength λ and Formula (1), and the vibration suppression portion 22 is provided on the surface of the peripheral wall 14 such that the distance L1 falls within the derived range.

Figure 6:
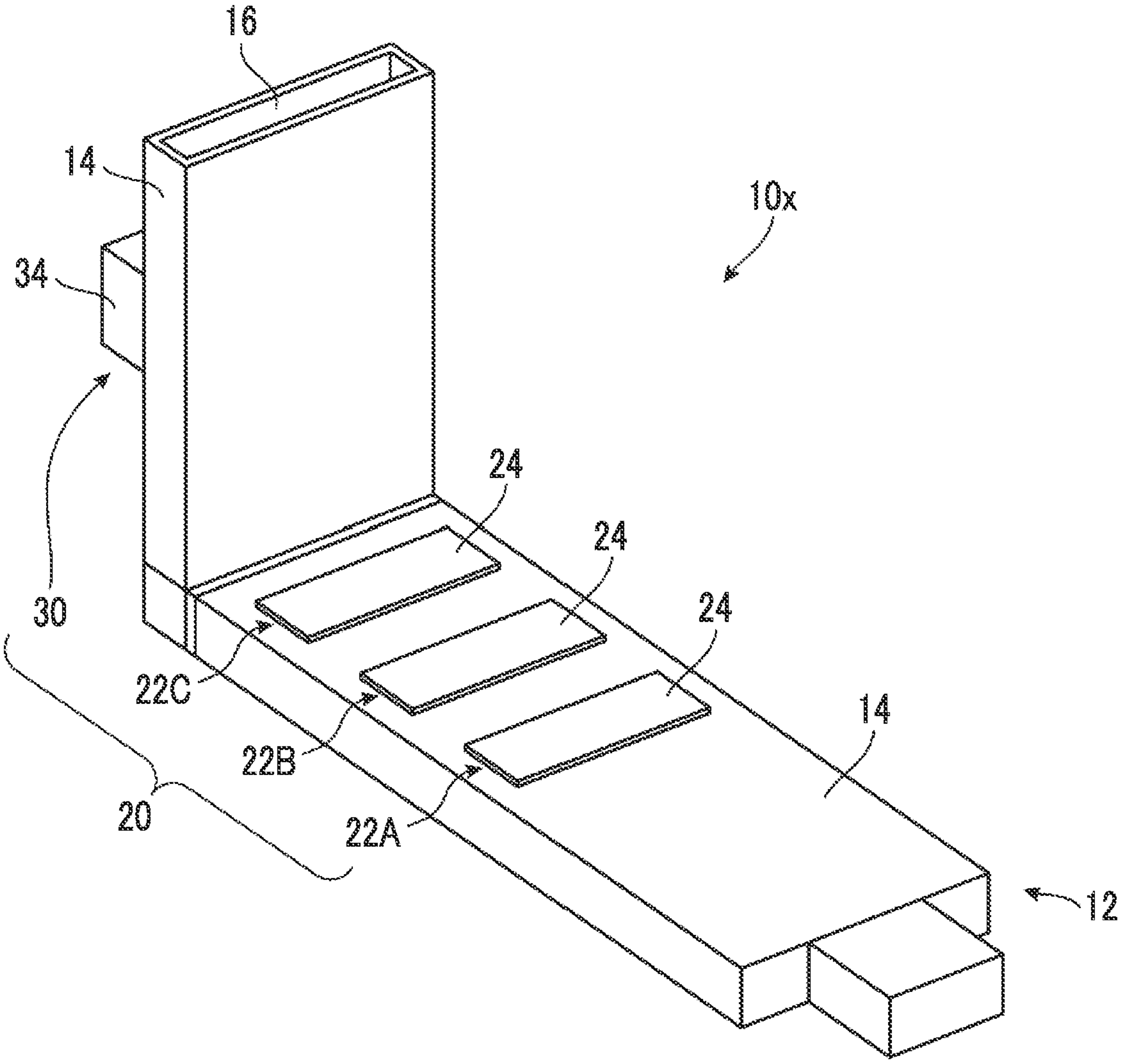
FIG. 6 is a view showing a ventilation path with a soundproof structure according to another embodiment of the present invention.

Meanwhile, since natural numbers m include a plurality of natural numbers (specifically, m=1, 2, 3, or 4) including 1, an area where the distance L1 satisfies Formula (1) can be determined for each of the plurality of natural numbers m. In this case, the vibration suppression portion 22 may be provided within each of the areas respectively determined for the natural numbers. For example, in a case where the natural numbers m are 1 to 3, as shown in FIG. 6, a vibration suppression portion 22A may be provided within an area related to a case where m=1, a vibration suppression portion 22B may be provided within an area related to a case where m=2, and a vibration suppression portion 22C may be provided within an area related to a case where m=3. FIG. 6 is a view showing a ventilation path 10*x* with a soundproof structure according to a modification example.

In addition, similarly, a position (hereinafter, referred to as a maximum displacement amount position) on the surface of the peripheral wall 14 at which the amount of vibration displacement is largest can also be determined for each of the plurality of natural numbers. Therefore, the vibration suppression portion 22 may be provided at each of the maximum displacement amount positions respectively determined for the natural numbers.

<Sound Absorption Unit>

The sound absorption unit 30 is a device or a structure that absorbs a sound wave. As shown in FIG. 2, the sound absorption unit 30 of the present embodiment is disposed between a portion of the ventilation path 12 at which the vibration suppression portion 22 is provided on the outer peripheral surface of the peripheral wall 14 and the open end 16.

More specifically, in the present embodiment, the vibration suppression portion 22 is provided upstream of the bend position of the ventilation path 12 and the sound absorption unit 30 is provided downstream of the bend position. This is because, in consideration of a fact that the sound absorption unit 30 functions favorably in the ventilation path 12 at a position at which the particle velocity is made high, it is desirable to dispose the sound absorption unit 30 in the vicinity of the open end 16 where the particle velocity is made high.

In addition, the vibration suppression portion 22 is used to suppress vibration of the peripheral wall 14 that is generated as a low-frequency sound is reflected at the open end 16 and to reduce a low-frequency radiated sound resulting from the vibration. On the other hand, the sound absorption unit 30 is used to reduce a high-frequency sound passing through the open end 16. The degree of reflection of a high-frequency sound at the open end 16 is small, and thus the degree of interference between an incident wave and a reflected wave of the high-frequency sound is small. As a result, vibration of the peripheral wall 14 caused by reflection of the high-frequency sound is not likely to occur. Therefore, the sound absorption unit 30 is more effective than the vibration suppression portion 22 as means for reducing a high-frequency sound.

As shown in FIG. 2, the sound absorption unit 30 of the present embodiment includes a sound absorbing material 32 disposed adjacent to the ventilation path 12. Specifically, at a portion of the peripheral wall 14 of the ventilation path 12 that is positioned between the bend position of the ventilation path 12 and the open end 16, an opening portion 18 (specifically, a through hole) for exposure is formed. The sound absorbing material 32 is disposed along the peripheral wall 14 such that a portion of a surface thereof (specifically, a surface facing the ventilation path 12 side) faces the inside of the ventilation path 12 through the opening portion 18.

The sound absorbing material 32 absorbs a high-frequency sound propagating in the ventilation path 12 through the opening portion 18. In addition, surfaces of the sound absorbing material 32 other than the surface facing the ventilation path 12 side are covered with a covering material 34. That is, the sound absorbing material 32 is accommodated in a closed space positioned on a rear surface side (a side opposite to the ventilation path 12) of the sound absorbing material 32. Since the rear surface side of the sound absorbing material 32 is covered and closed by the covering material 34 as described above, a sound leaking to the outside from the sound absorbing material 32 can be suppressed.

As the sound absorbing material 32, a known sound absorbing material that absorbs a sound by converting sound energy into thermal energy can be used as appropriate. Examples of the sound absorbing material 32 include a foaming body, a foaming material, and a nonwoven fabric sound absorbing material. Specific examples of the foaming body and the foaming material include foaming urethane foam such as CALMFLEX F manufactured by INOAC CORPORATION and urethane foam manufactured by Hikari Co., Ltd., flexible urethane foam, a ceramic particle sintered material, phenol foam, melamine foam, and a polyamide foam. Specific examples of the nonwoven fabric sound absorbing material include a microfiber nonwoven fabric such as Thinsulate manufactured by 3M Company, and a polyester nonwoven fabric (including a two-layer fabric that includes a high-density thin surface nonwoven fabric and a low-density rear surface nonwoven fabric) such as White Kyuon manufactured by TOKYO Bouon and QonPET manufactured by Bridgestone KBG Co., Ltd., a plastic nonwoven fabric such as an acrylic fiber nonwoven fabric, a natural fiber nonwoven fabric such as wool and felt, a metal nonwoven fabric, and a glass nonwoven fabric.

In addition to the above-descried examples, various known sound absorbing materials such as a sound absorbing material consisting of a material including a minute amount of air (specifically, a sound absorbing material consisting of glass wool, rock wool, and nanofiber-based fiber) can be used as the sound absorbing material 32. Examples of the nanofiber-based fiber include silica nanofiber and acrylic nanofiber such as XAI manufactured by Mitsubishi Chemical Corporation.

Furthermore, as the sound absorbing material 32, a plate or a film in which innumerable through holes having a diameter of about 100 μm are formed, like a micro perforated plate, can be used and a sound can be absorbed by means of such a sound absorbing material and a rear surface space thereof. Examples of the micro perforated plate include an aluminum micro perforated plate such as SUONO manufactured by DAIKEN CORPORATION and a vinyl chloride resin micro perforated plate such as DI-NOC manufactured by 3M Company.

In addition, the covering material 34 may be formed of the same material as the peripheral wall 14 of the ventilation path 12, or may be formed of a material different from the material of the peripheral wall 14. Examples of the material of the covering material 34 include a metal material, acryl, a resin material such as ABS resin and ASA resin, a reinforced plastic material, and a carbon fiber. In addition, the material constituting the covering material 34 may be a plate material, a film material, a sheet material, or the like.

In addition, the sound absorption unit 30 may not include the sound absorbing material 32 and may include a sound absorber that absorbs a sound with a different mechanism, for example, a sound absorber having a plate-like shape or a film-like shape and a sound absorber consisting of a perforated plate. The sound absorber having a plate-like shape or a film-like shape resonates the case of incidence of a sound having a frequency close to the resonance frequency thereof, and absorbs the sound by converting sound energy into thermal energy with an internal loss of a plate or a film. The sound absorber consisting of a perforated plate is a type of resonator-type sound absorption structure and in the case of collision with a sound having the same frequency as a resonance frequency, air corresponding to a hole portion vibrates and sound energy is converted into thermal energy with viscosity loss accompanied by the vibration.

In addition, the sound absorbing material 32 or other sound absorption mechanisms may not be provided outside the ventilation path 12 as shown in FIG. 2 and may be disposed inside the ventilation path 12.

Hereinabove, the ventilation path with a soundproof structure according to an aspect of the invention has been described by using specific configuration examples. However, the above-described configuration examples are merely examples and there are other conceivable configurations.

For example, in the configuration examples described above, the ventilation path 12 is bent. However, the present invention is not limited thereto, and the ventilation path 12 may extend linearly. Even in such a case, vibration of the peripheral wall 14 can be effectively suppressed and a low-frequency sound resulting from the vibration can be effectively reduced in a case where the vibration suppression portion 22 is provided on the surface of the peripheral wall 14 within an area where the distance L1 satisfies Formula (1).

In addition, in the above-described configuration examples, the open end 16 is the outlet of the ventilation path 12. However, the present invention is not limited thereto. The open end may be provided at an intermediate position of the ventilation path 12 (that is, may be provided upstream of the outlet). In addition, an upstream-side end of the ventilation path 12, that is, an end on a side on which connection to the blower and the fan is made may be the open end. In such cases, vibration of the peripheral wall 14 can be effectively suppressed and a low-frequency sound resulting from the vibration can be effectively reduced in a case where the vibration suppression portion 22 is provided at an appropriate position in consideration of a distance from each open end.

In addition, in the configuration examples described above, the sound absorption unit 30 is provided downstream of the bend position of the ventilation path 12. However, a configuration in which the sound absorption unit 30 is not provided may also be adopted. However, in a case where the sound absorption unit 30 is provided, a high-frequency sound passing through the open end 16 can be attenuated (absorbed) and thus a radiated sound from the entire ventilation path 12 can be more favorably attenuated (absorbed). In this point, the above-described configuration examples are more effective.

EXAMPLES

Hereinafter, the present invention will be more specifically described with reference to examples.

Note that materials, amounts of use, proportions, contents of treatments, procedures for treatments, and the like described in the following examples can be modified as appropriate without departing from the gist of the present invention. That is, the scope of the present invention is not limited to the following examples.

As Reference Examples 1 and 2 which will be described before the examples, simulations and measurement tests were carried out on an emitted sound from a ventilation path not provided with a soundproof structure.

Reference Example 1

In Reference Example 1, a rectangular linear duct was used as a model of the ventilation path. The linear duct had a cross-sectional shape consisting of an oblong shape having a size of 14 mm×60 mm and included an open end provided on an outlet side.

<Simulation>

In Reference Example 1, first, the volume of a radiated sound radiated from the open end of the duct was obtained through a simulation in a state where there was no vibration. A finite element method (COMSOL Multiphysics ver 5.6) was adopted for calculation in the simulation, one end side of the duct was used as a plane wave incidence boundary, and the other end side of the duct was used as an opening radiation end (the open end). In addition, in the simulation, the volume of an incidence sound was set such that energy stays the same at any frequency.

Figure 7:
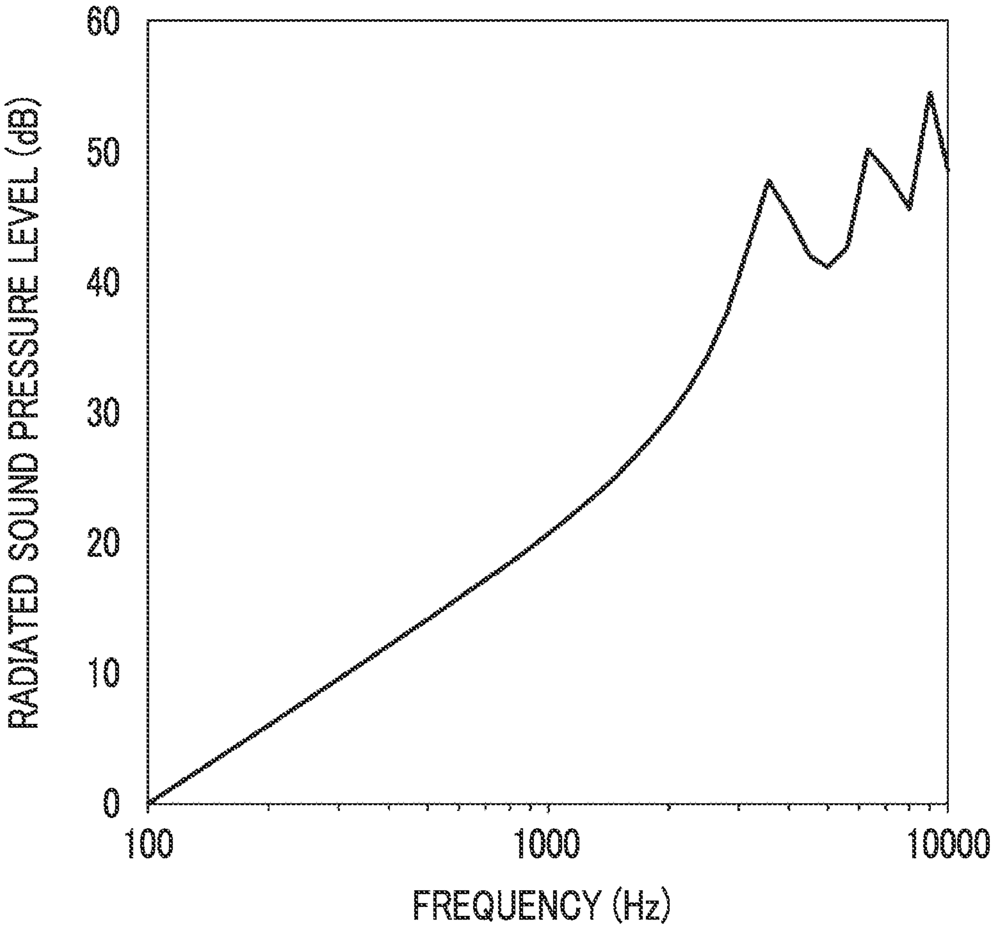
FIG. 7 is a graph showing the result of a simulation on a radiated sound from a duct in Reference Example 1.

FIG. 7 shows the volume of a radiated sound related to a case where there is no vibration. As can be understood from FIG. 7, since a sound on a low frequency side is reflected on the open end side, the volume of the radiated sound is small on the low frequency side and the volume of the radiated sound increases as the frequency increases. Note that a frequency at which a long side (=60 mm) of the cross section of the duct is ½ of a wavelength ($\lambda/2$) is 2.85 kHz, and the volume of the radiated sound is substantially constant on a side of a higher frequency than such a frequency.

At the open end of the duct, a steep change in area occurs from the area (cross-sectional area) of the inside of the duct to the area outside the duct which is approximately infinite. Therefore, at the open end of the duct, there is a steep change in acoustic impedance that is inversely proportional to the cross-sectional area. The larger an acoustic impedance ratio is, the higher the sound reflectivity is. Therefore, a reflectivity at the open end of the duct is high. Note that complete reflection does not occur since end portions of the cross section of the duct in a longitudinal direction interfere with each other in practice, and the shorter the wavelength is (that is, the higher the frequency is), the larger the volume of a radiated sound is. Therefore, the volume of a radiated sound with respect to each frequency changes as shown in FIG. 7.

<Measurement Test>

The above-described linear duct having a rectangular cross section was molded with an acrylonitrile butadiene styrene (ABS) resin by using a 3D printer manufactured by XYZ printing, Inc. The molded duct had a cross section of 14 mm×60 mm and a duct length of 500 mm. In addition, to simulate a vibrating portion of a housing (that is, a peripheral wall) of the duct, the thickness of the housing was set to 1.5 mm over an area at which the distance from the open end of the duct was 60 mm to 240 mm (that is, over an area having a length of 180 mm). The thickness of the other portions was set to 10 mm, which is a sufficiently large thickness.

As described above, in the measurement test of Reference Example 1, the linear duct including vibrating portions of 180 mm×60 mm and vibrating portions of 180 mm×14 mm over the above area was created.

Figure 8:
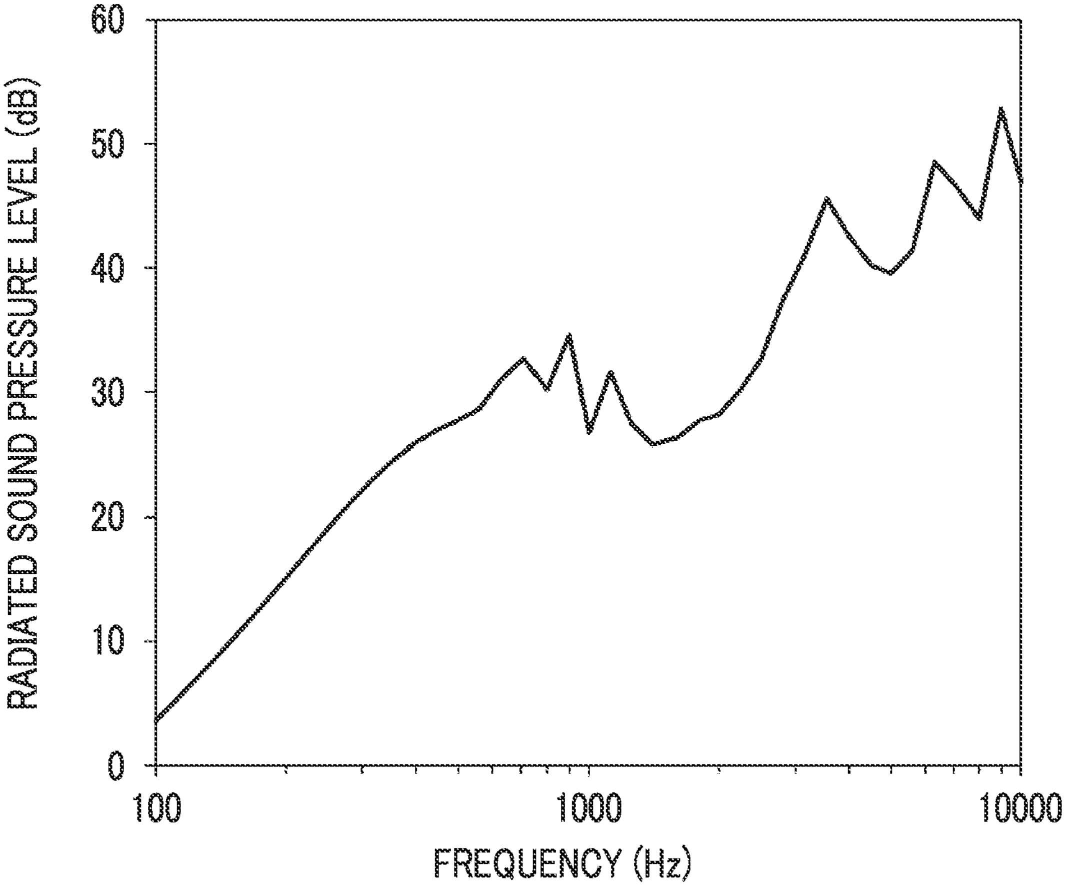
FIG. 8 is a graph showing the result of measurement on the radiated sound from the duct in Reference Example 1.

Then, a speaker was disposed at one end (an end on a side distant from the vibrating portions) of the created linear duct and the speaker was caused to output a white noise sound for measurement of the volume of a radiated sound from the entire duct. The measurement of the volume of the radiated sound (the volume of noise) from the entire duct was carried out in an anechoic room following a known measurement procedure (specifically, ISO 3745: 2012). In this case, the acoustic power level (that is, the radiated sound pressure level) was measured for not only a sound emitted from an outlet of the duct but also a sound resulting from vibration of the duct. FIG. 8 shows the result of the measurement.

As can be understood from FIG. 8, unlike the result of the simulation shown in FIG. 7, the peaks of the volume of the radiated sound were confirmed not only on the high frequency side but also on the low frequency side around a range of 600 to 1000 Hz.

In addition, for analysis of the result of the above-described measurement, a structural acoustic coupling simulation was performed by using a duct model, of which the material and the thickness of a housing were set to be the same as those in the measurement test, and using a finite element method. In this case, in order to isolate the causes of radiated sounds, the volume of a radiated sound caused by vibration of the duct and the volume of a radiated sound radiated from the open end of the duct were analyzed separately. The result of the analysis is shown in FIG. 9.

Figure 9:
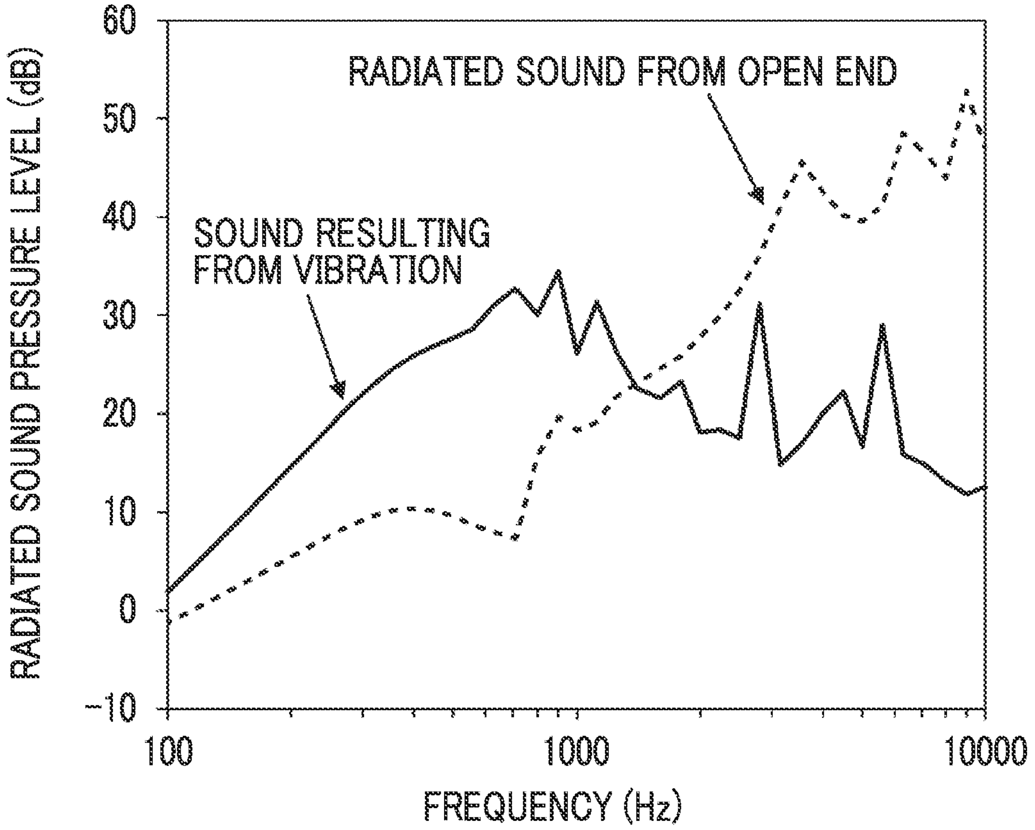
FIG. 9 is a graph showing the result of a simulation performed for analysis of the result of the measurement in Reference Example 1.

As can be understood from FIG. 9, there was a result in which the volume of a sound radiated from the open end of the duct was large on a side of a higher frequency than approximately 1.5 kHz, which was consistent with the result shown in FIG. 7. Meanwhile, it was found that the volume of the radiated sound from the open end was small but the volume of the radiated sound caused by the vibration of the duct was large in a band of approximately 1.5 kHz or less.

Figure 10:
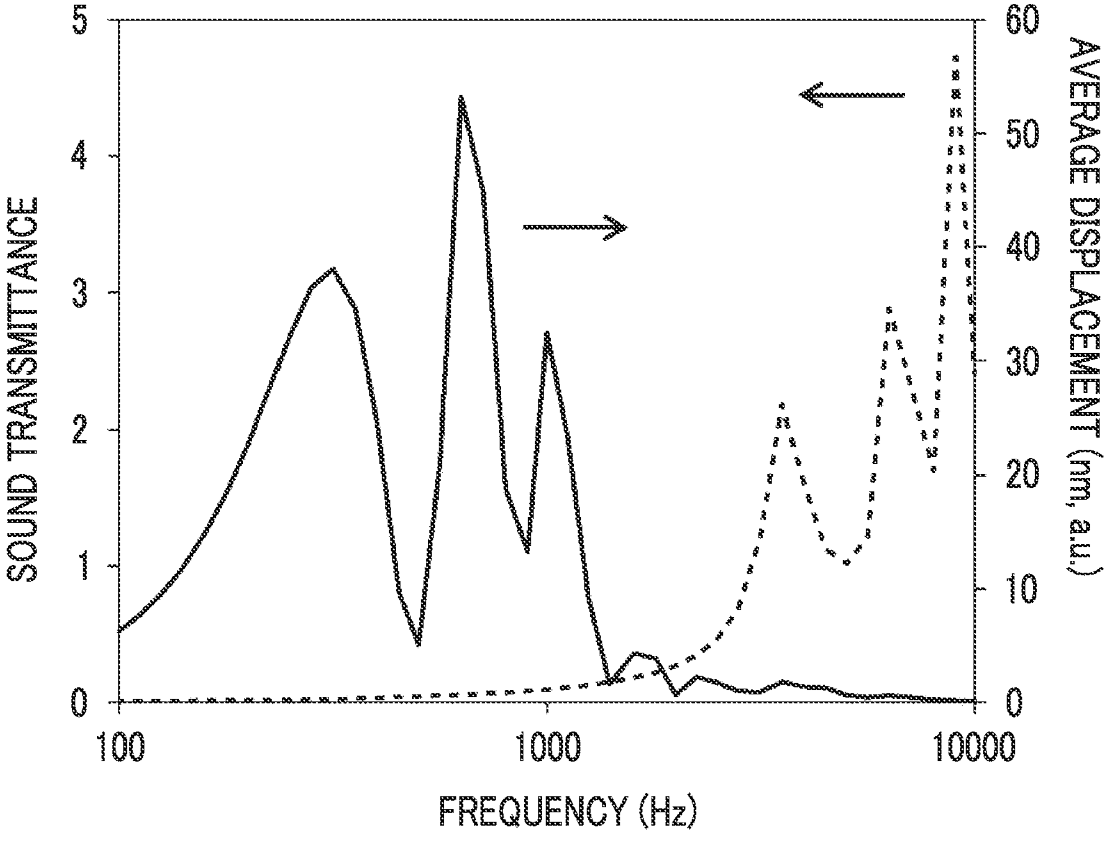
FIG. 10 is a graph showing the result of calculation on the sound transmittance (a broken line) at a duct opening in Reference Example 1 and the amount of vibration displacement (a solid line) of the entire housing of the duct.

In addition, calculation was performed to obtain the amount of vibration displacement of the entire housing of the duct. FIG. 10 shows the result of the calculation.

As can be understood from FIG. 10, in a band on the low frequency side in which the sound transmittance at the open end of the duct was low (that is, the sound reflectivity was high), the amount of vibration displacement was about ten times the amount of vibration displacement on the high frequency side. From such a result, it is conceivable that a radiated sound from the duct in the vicinity of the open end includes not only a sound emitted from the open end but also a sound attributable to vibration of the housing of the duct on the low frequency side. Accordingly, it was found that, for effective suppression of a radiated sound of the duct, it is necessary to suppress vibration of the housing in a low frequency band.

Comparative Example 1

In Comparative Example 1, a linear duct was created in the same manner as in Reference Example 1. In addition, opening portions each having a width of 40 mm (a hold of 60 mm×40 mm) were provided in two surfaces of the duct over an area at which the distance from the open end of the duct was 10 to 50 mm. A sound absorbing material "Qon-PET" manufactured by Bridgestone KBG Co., Ltd. was attached with respect to each of the opening portions. The length in a direction in which the duct extended, the thickness, and the lateral width of the sound absorbing material were 40 mm, 10 mm, and 60 mm, respectively.

In addition, the entire surface of the sound absorbing material except a surface facing the duct side was covered with a box-shaped body created by using an acrylic plate having a thickness of 5 mm. That is, a sound absorption unit with a closed rear surface was provided in the vicinity of the open end of the duct (a ventilation path).

Figure 11:
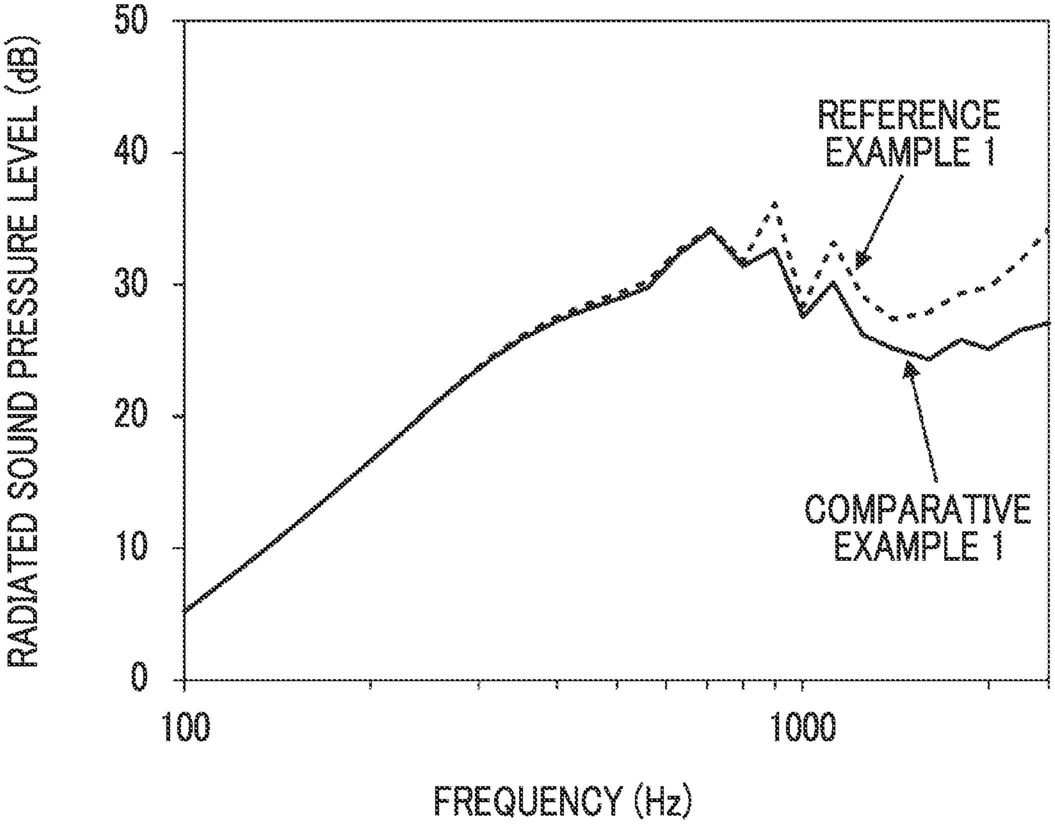
FIG. 11 is a graph showing the result of measurement on a radiated sound from a duct in Comparative Example 1.

Then, measurement was performed for a radiated sound from the duct following the same procedure as in the measurement test in Reference Example 1. FIG. 11 shows the result of the measurement. In addition, in FIGS. 11 to 16, the result of the measurement in Reference Example 1 is represented by a broken line as a comparison target.

As can be understood from FIG. 11, in a band on a high frequency side, the radiated sound was reduced due to the effect of the sound absorbing material but the amount of reduction (the amount of sound attenuation) was small in a band on a low frequency side. Particularly, the radiated sound was not reduced at all in a band of 800 Hz or less. From this result, it was found that the sound attenuation effect of the sound absorbing material is limited. That is, in the vicinity of the open end of the duct, the local particle velocity of a sound is high and thus the sound attenuation effect of the sound absorbing material is generally high. However, it has been found that it is difficult to attenuate a sound resulting from vibration of the housing of the duct, which is caused by reflection, with the sound absorbing material.

Example 1

In Example 1, the linear duct of Reference Example 1 was used. A vibration damping material "Calmoon sheet" manufactured by Sekisui Chemical Co., Ltd. was attached to the entire surface of a vibrating portion of the duct that had a thickness of 1.5 mm. The vibration damping material had a two-layer structure with a steel galvanized cold commercial (SGCC) steel plate and a vibration damping adhesive rubber, and had a total thickness of 1.3 mm.

Figure 12:
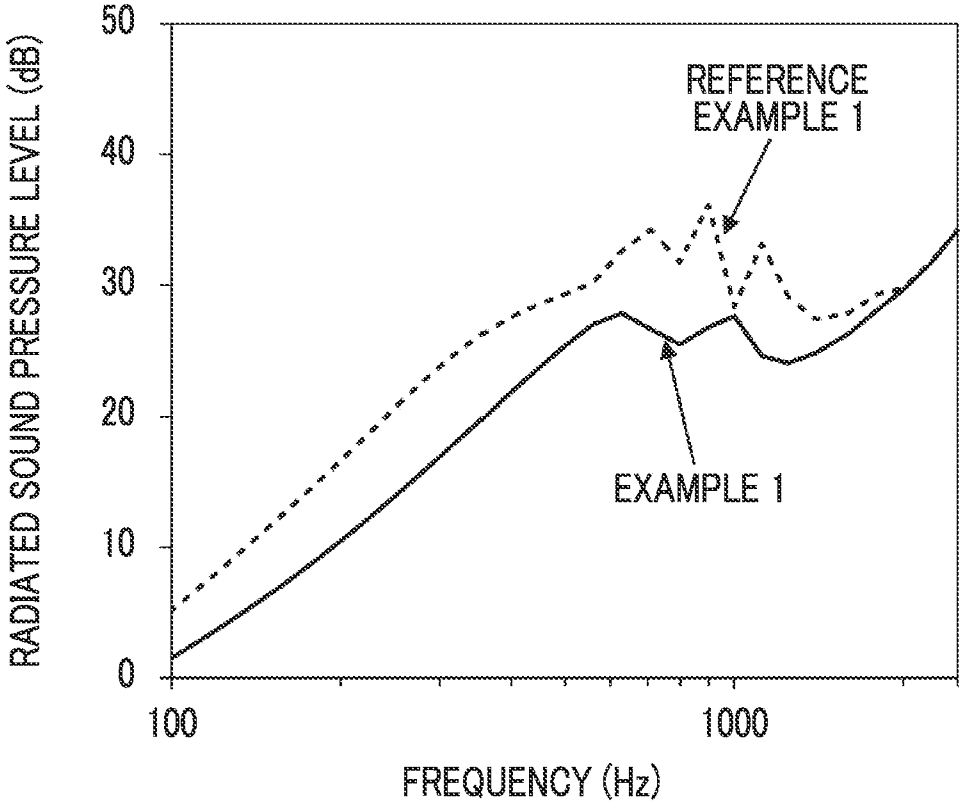
FIG. 12 is a graph showing the result of measurement on a radiated sound from a duct in Example 1.

Then, measurement was performed for a radiated sound from the duct following the same procedure as in the measurement test in Reference Example 1. FIG. 12 shows the result of the measurement.

As can be understood from FIG. 12, in Example 1, a radiated sound on the low frequency side could be suppressed as a whole. More specifically, the natural frequencies of a duct housing (a plate material) were 700 Hz, 900 Hz, and 1100 Hz from the low-ordinal number side (m=1, 2, 3), and 12.3 cm, 9.5 cm, and 7.5 cm were ¼ times ($\lambda/4$) the wavelengths of sounds respectively corresponding to the natural frequencies. A main vibrating portion of the duct housing created in Reference Example 1 was positioned within an area at which the distance from the open end was 6 cm to 24 cm. Therefore, all of amplitude antinodes (that is, sound pressure antinodes) respectively corresponding to the above-described three wavelengths were within the above-described area and the vibration damping material was provided in the area. Therefore, it is considered that a radiated sound on the low frequency side could be effectively attenuated as shown in FIG. 12.

Example 2

Figure 13:
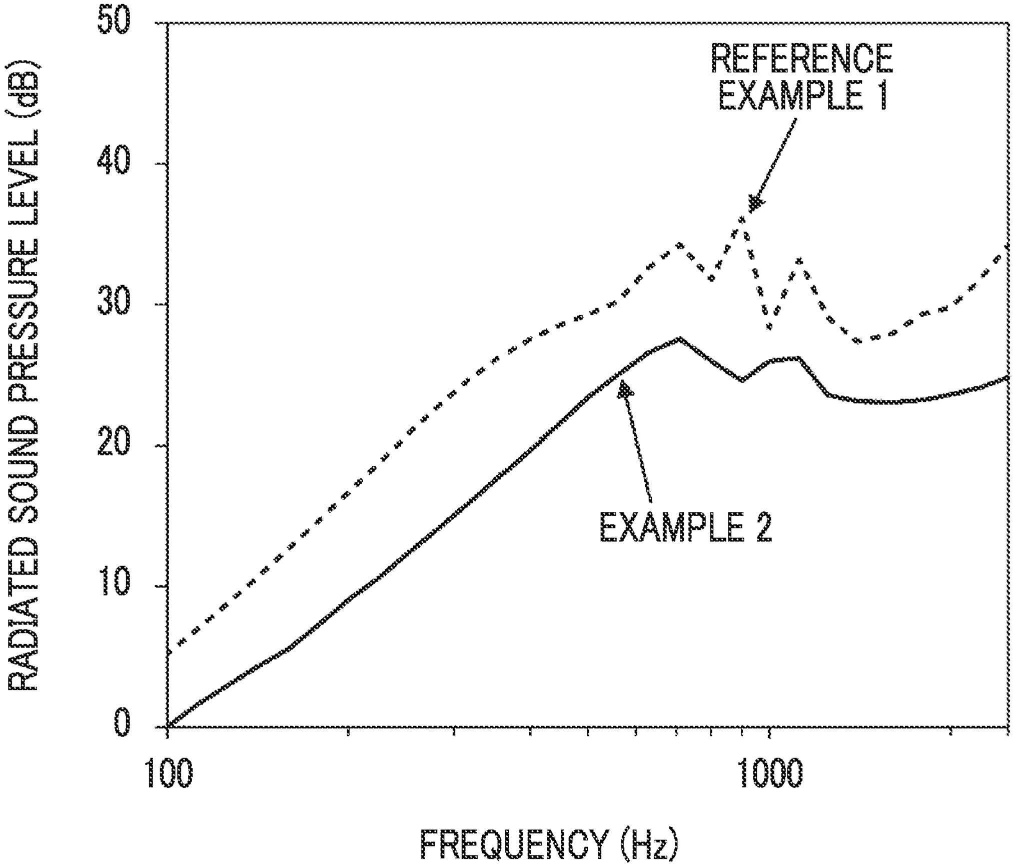
FIG. 13 is a graph showing the result of measurement on a radiated sound from a duct in Example 2.

In Example 2, the vibration damping material "Calmoon Sheet" was attached, in the same manner as in Example 1, to the entire surface of the vibrating portion of the linear duct with the sound absorbing material used in Comparative Example 1 and a radiated sound from the duct was measured. FIG. 13 shows the result of the measurement.

As can be understood from FIG. 13, both of a sound attenuation effect (specifically, a vibration damping and sound attenuation effect) of the vibration damping material with respect to a low-frequency sound and a sound absorption effect of the sound absorbing material with respect to a high-frequency sound were exhibited, and thus a high sound attenuation effect was obtained over the entire spectrum of the radiated sound.

Example 3

In Example 3, instead of affixing the vibration damping material "Calmoon Sheet" to the entire surface of the vibrating portion (specifically, the vibrating portion of 180 mm×60 mm) of the linear duct of Reference Example 1, "Calmoon Sheet" cut into a size of 40 mm×90 mm was affixed. That is, the vibration damping material 24 was attached to a region corresponding to ⅓ of the area of the entire surface of the vibrating portion.

Figure 14:
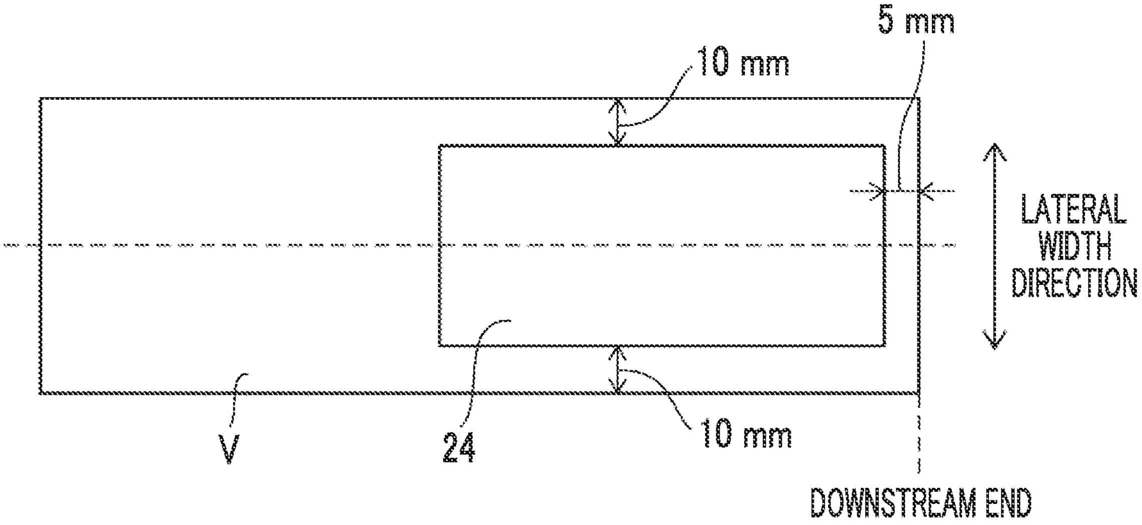
FIG. 14 is a plan view showing a position at which a vibration damping material is disposed in Example 3.

In addition, in Example 3, as shown in FIG. 14, a central position of the vibration damping material 24 in a lateral width direction was caused to coincide with a central position of the duct in the lateral width direction. In other words, the vibration damping material 24 was affixed to a vibrating portion V of the duct with an interval of 10 mm provided between a lateral end of the vibration damping material 24 and a lateral end of the duct at each of both end portions of the duct. In addition, as shown in FIG. 14, the vibration damping material 24 was set to make a downstream end of the vibration damping material 24 present at a position separated from a downstream end of the vibrating portion V (an end on a side close to the open end) by 5 mm in a direction in which the duct extended.

Figure 15:
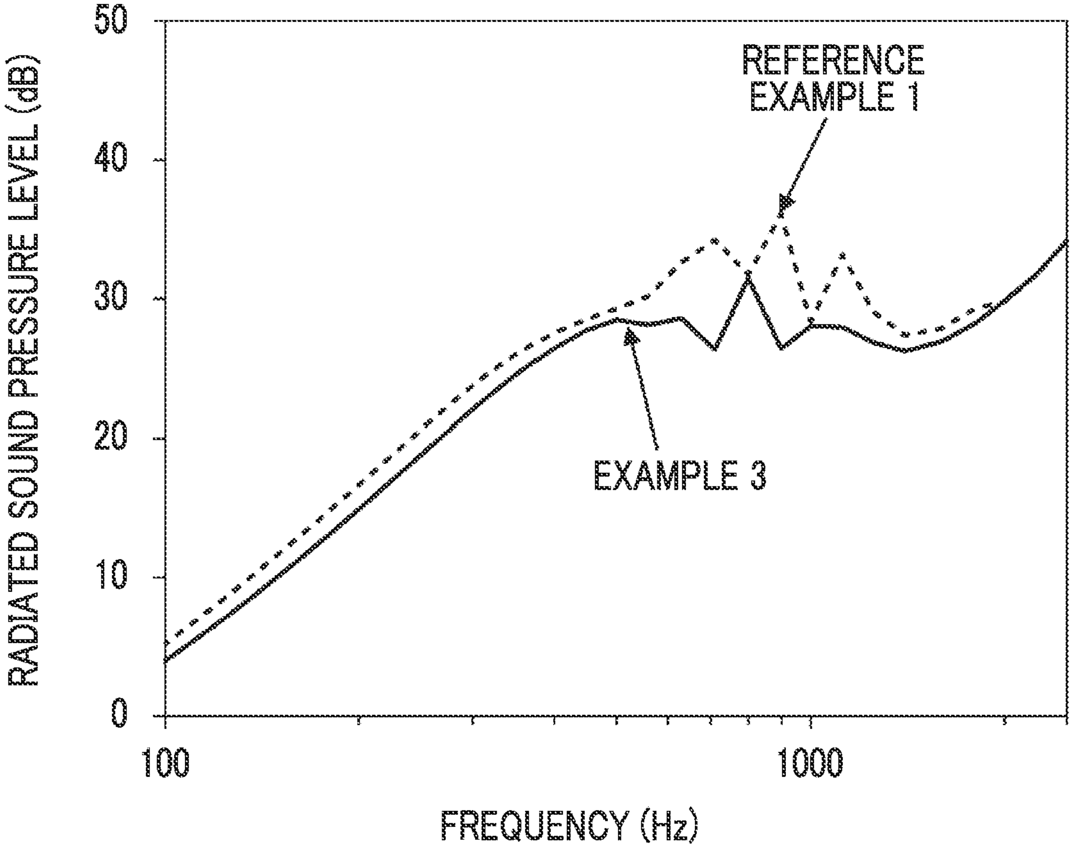
FIG. 15 is a graph showing the result of measurement on a radiated sound from a duct in Example 3.

Then, measurement was performed for a radiated sound from the duct following the same procedure as in the measurement test in Reference Example 1. FIG. 15 shows the result of the measurement. The result of the measurement in Example 3 will be described later.

Example 4

Figure 16:
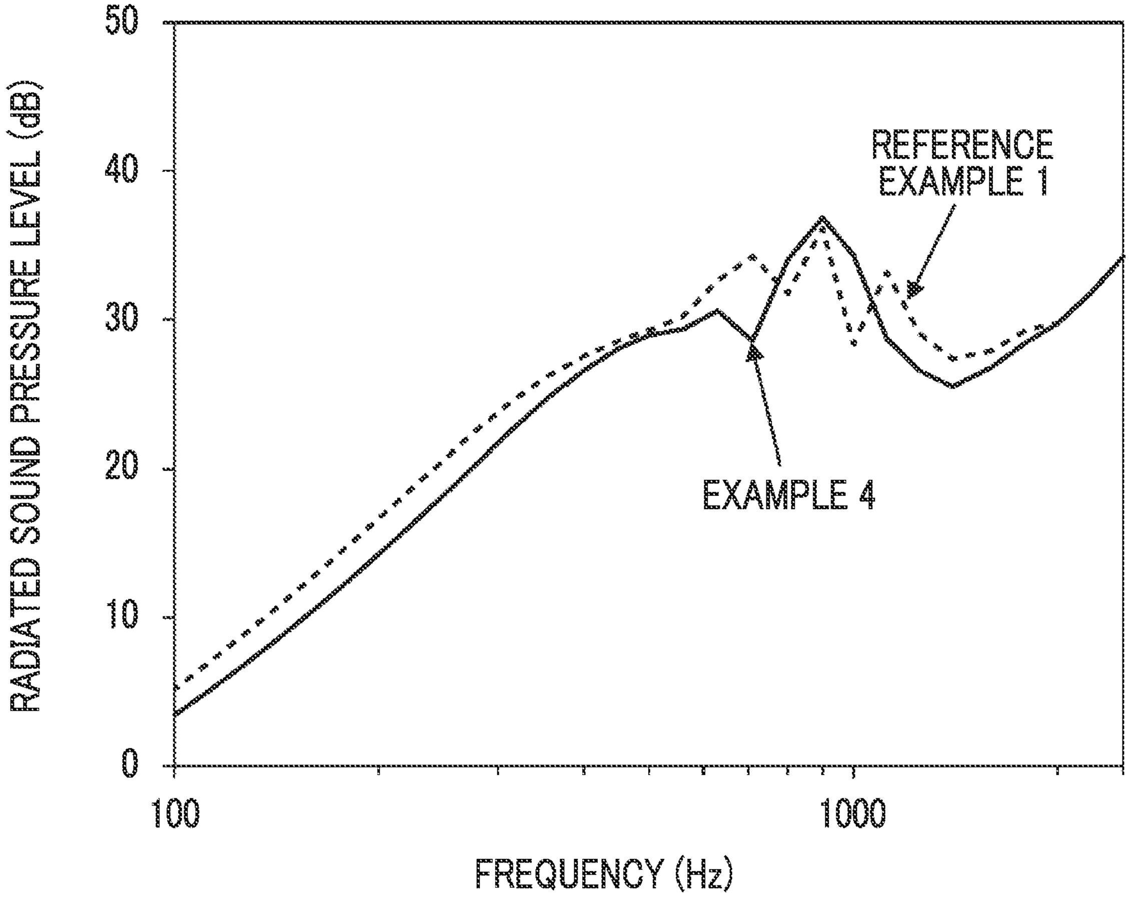
FIG. 16 is a graph showing the result of measurement on a radiated sound from a duct in Example 4.

In Example 4, the vibration damping material 24 was affixed to make an upstream end of the vibration damping material present at a position separated from an upstream end of the vibrating portion V (an end on a side distant from the open end) by 5 mm in a direction in which the duct extended. The configuration of the duct was the same as that in Example 3 except for the above-described point. Then, measurement was performed for a radiated sound from the duct following the same procedure as in the measurement test in Reference Example 1. FIG. 16 shows the result of the measurement. The result of the measurement in Example 4 will be described later.

(Result of Measurement in Example 2 to Example 4)

In Example 2, the natural frequencies of the vibrating portion (a plate) of the duct were 700 Hz, 900 Hz, and 1100 Hz from the low-ordinal number side (m=1, 2, 3), and 12.3 cm, 9.5 cm, and 7.5 cm were ¼ times (λ/4) the wavelengths of sounds respectively corresponding to the natural frequencies. Here, the vibrating portion (the plate material) extended from a position at which the distance from the open end of the duct was 6 cm. Therefore, for each of the above-described three wavelengths, positions (that is, the positions of antinodes) at each of which the distance from the open end was λ/4 were 6.3 cm, 3.5 cm, and 1.8 cm as seen from a downstream end of the vibrating portion.

In addition, all of the positions of the antinodes respectively corresponding to the above-described wavelengths were within a vibration damping material attachment area in Example 3 (that is, within an area at which the distance from the downstream end of the vibrating portion was 0.5 cm to 9.5 cm).

In Example 4, all of the positions of the antinodes respectively corresponding to the wavelengths were outside a vibration damping material affixation area (an area at which the distance from the downstream end of the vibrating portion was 8.5 cm to 17.5 cm). In addition, regarding the wavelength k corresponding to the natural frequency of 700H related to a case where m=1, a position at which the distance from the open end was ⅜k (=λ/4+λ/8) was separated from the downstream end of the vibrating portion by 12.4 cm and thus the position was within the vibration damping material attachment area. Meanwhile, regarding the natural frequency of 900 Hz in the case of m=2 and the natural frequency of 1100 Hz in the case of m=3, a position at which the distance from the open end was ⅜k was outside the vibration damping material attachment area.

As described above, in the case of Example 3 in which the vibration damping material was attached to the position at which the distance from the open end is λ/4 (that is, the position of a sound pressure antinode), the vibration suppression effect of the vibration damping material was large over a wide frequency band. Particularly, in the case of Example 3, the vibration damping material was present at a position on the vibrating portion where the amount of vibration displacement is large and thus a higher sound attenuation effect was obtained.

Reference Example 2

In Reference Example 2, as shown in FIG. 1, a duct bent into an L-like shape was used as a model of the ventilation path. The cross-sectional shape of the duct was an oblong shape of 14 mm×28 mm at an inlet and was an oblong shape of 14 mm×60 mm at a portion other than the inlet. In addition, the duct was bent at the right angle at an intermediate position. There was an interval (a length corresponding to a symbol d in FIG. 1) of 180 mm between a bend position of the duct and the inlet. In addition, the height (a length corresponding to a symbol h in FIG. 1) of a portion of the duct perpendicularly rising from the bend position was 80 mm.

<Measurement Test>

In a measurement test of Reference Example 2, the above-described L-shaped duct was molded with an acrylonitrile butadiene styrene (ABS) resin by using a 3D printer manufactured by XYZ printing, Inc. The thickness of a duct housing (that is, a peripheral wall) was 1.5 mm.

Then, a white noise sound was caused to be incident from an inlet of the duct and measurement was performed for a duct propagating sound following the same procedure as in Reference Example 1. The measurement of an emitted sound (the volume of noise) from the entire duct was carried out in an anechoic room following a known measurement procedure (specifically, ISO 3745: 2012). In this case, the acoustic power level (that is, the radiated sound pressure level) was measured for not only a sound emitted from an outlet of the duct but also a sound resulting from vibration of the duct housing.

<Simulation>

In Reference Example 2, the L-shaped duct was modeled using the finite element method (COMSOL MultiPhysics), and acoustic characteristics were calculated. Specifically, similarly to Reference Example 1, a calculation model in which acoustics and structural mechanics were strongly coupled was constructed and a radiated sound from the duct was calculated (simulated).

In addition, in the above-described calculation model, a radiated sound attributable to vibration of the duct housing and a propagating sound propagating through the duct and exiting through a duct outlet (the open end) were detected separately. Then, a contribution made by each sound was calculated for each frequency.

Figure 17:
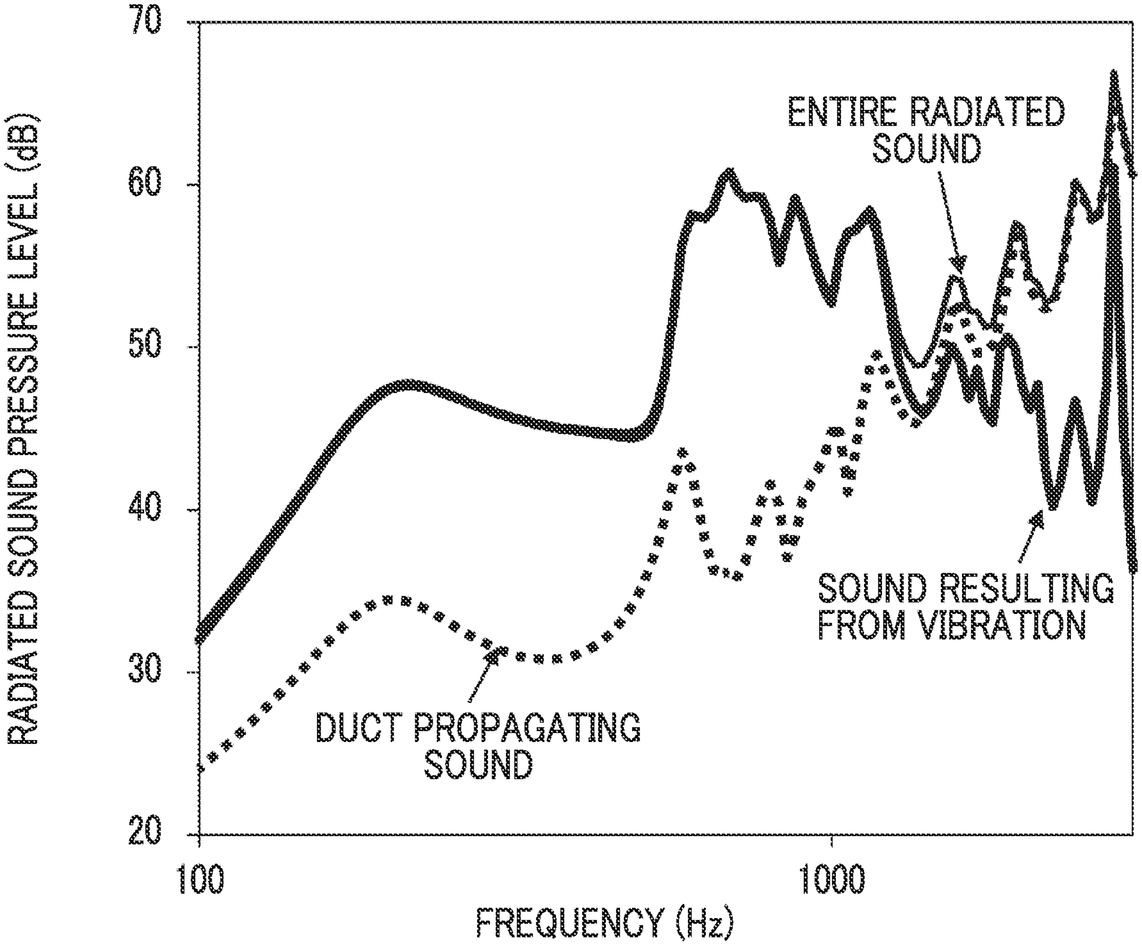
FIG. 17 is a graph showing the result of a simulation on a radiated sound from a duct in Reference Example 2.

FIG. 17 shows the result of the simulation in Reference Example 2. As can be understood from FIG. 17, in a band of about 1500 Hz or higher, the duct propagating sound was the main component. It was found that a contribution made by the radiated sound attributable to the vibration of the duct housing was larger than a contribution made by the duct propagating sound in a band of frequencies equal to or lower than 1500 Hz.

In addition, in a band on a low frequency side, similarly to Reference Example 1, the sound reflectivity was high at a duct open end and thus an acoustic mode (a standing wave) is formed inside the duct and the sound caused by the vibration of the duct housing was radiated as a radiated sound. That is, it was speculated that the sound pressure of the radiated sound resulting from the vibration was made high since the sound pressure in the duct was made high due to a reflected sound and the housing became likely to vibrate at a portion (a front stage portion) positioned upstream of a position at which the duct was bent.

In addition, as can be understood from FIG. 17, there was a region in the vicinity of 700 Hz (specifically, in a band of 600 to 1200 Hz) in which the sound pressure of the radiated sound resulting from the vibration was large. As described above, this region was a region in which the degree of vibration became large.

In addition, in the above-described region, a large radiated sound was confirmed due to vibration at a natural frequency determined by the size, the thickness, the material, the fixation method, and the like of the duct housing (the plate material). In addition, it was found from the amount of displacement of each portion of the duct housing obtained through the simulation that the volume of a radiated sound attributable to vibration of the housing (the plate material) was larger at a portion (the front stage portion) positioned upstream of a bend position of the duct.

In addition, assuming that λ is a wavelength corresponding to the natural frequency of the duct housing alone, a distance corresponding to λ/4 is 12.3 cm in the case of a natural frequency of 700 Hz and is 9.5 cm in the case of a natural frequency of 900 Hz. Here, since the distance from the open end of the duct to the bend position was 8 cm, in a case where the natural frequencies are 700 Hz and 900 Hz, the position of λ/4, that is, the sound pressure antinode is present in the housing upstream of the bend position. Therefore, it was speculated that the volume of a radiated sound resulting from vibration caused by a sound pressure was made large at the housing upstream of the bend position since the sound pressure antinode was present in the housing upstream of the bend position.

Note that, actual measurement was performed for a radiated sound from the duct in Reference Example 2 and it was confirmed that the spectrum of the radiated sound calculated in the simulation was reproduced in the result of the actual measurement.

Comparative Example 2

In Comparative Example 2, the L-shaped duct of Reference Example 2 was used and the sound absorbing material "QonPET" manufactured by Bridgestone KBG Co., Ltd. was disposed at the position of connection to the inside (the ventilation path) of the duct. The length in a direction in which the duct extended, the thickness, and the lateral width of the sound absorbing material were 50 mm, 20 mm, and 60 mm, respectively. The sound absorbing material was disposed at a position at which the distance from the outlet (open end) of the duct was 20 mm. In addition, surfaces (side surfaces and a rear surface) of the sound absorbing material other than a surface facing the duct side were covered with a cover having a thickness of 3 mm and consisting of an acrylonitrile butadiene styrene (ABS) resin. That is, the L-shaped duct was provided with a sound absorption unit with a closed rear surface.

Figure 18:
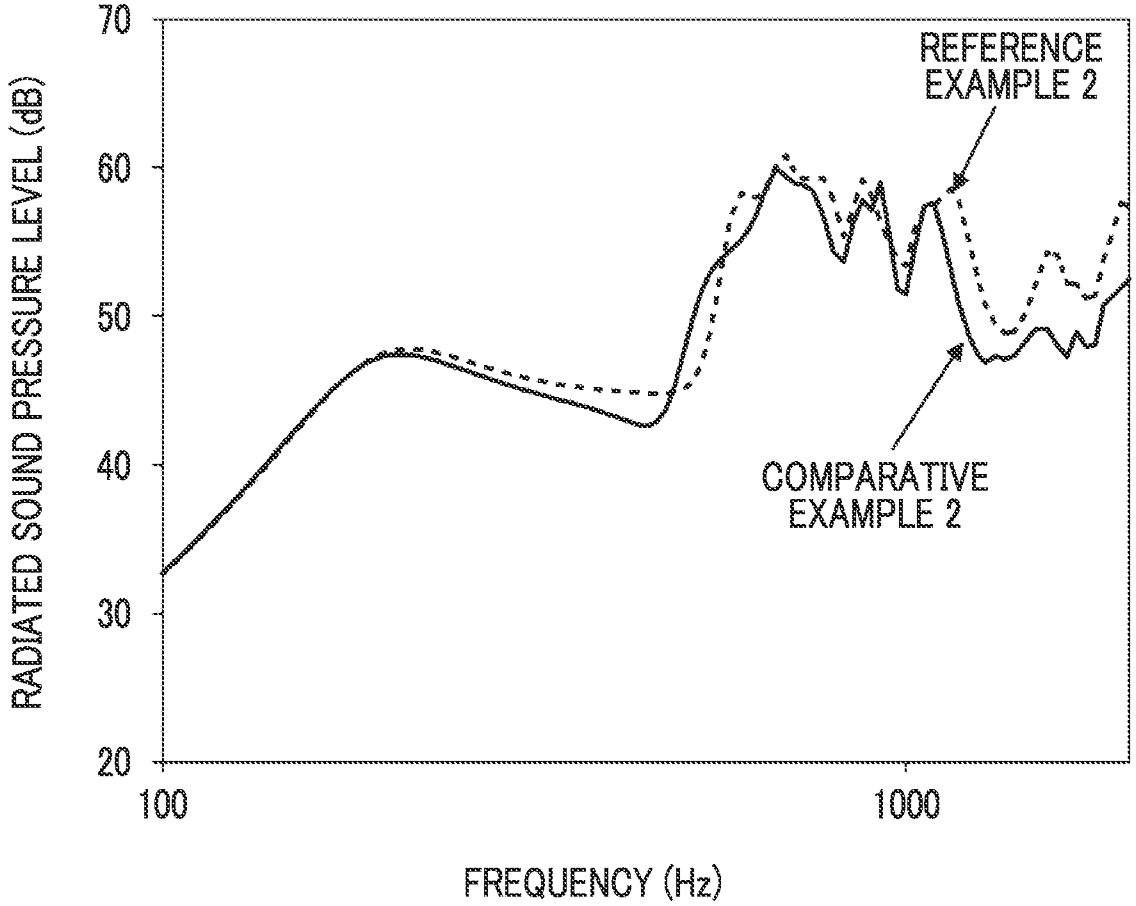
FIG. 18 is a graph showing the result of measurement on a radiated sound from a duct in Comparative Example 2.

Then, the acoustic power level (the radiated sound pressure level) of a sound radiated from the duct was measured in the same manner as in Reference Example 2. FIG. 18 shows the result of the measurement. In addition, in FIGS. 18 to 23, the result of the measurement in Reference Example 2 is represented by a broken line as a comparison target.

As can be understood from FIG. 18, in a band of about 1500 Hz or higher, the amount of sound attenuation increased toward the high frequency side. Meanwhile, the amount of sound attenuation was small on the low frequency side and particularly, there was almost no sound attenuation in a band of 1000 Hz or less. As described also in the section of Reference Example 2, it was speculated that this is because a radiated sound resulting from vibration of the duct housing was dominant on the low frequency side and the sound absorbing material positioned downstream of the bend position was almost not able to attenuate a low-frequency radiated sound.

Example 5

It was speculated from the result of the simulation in Reference Example 2 that vibration of the duct housing contributed to the radiated sound on the low frequency side. Therefore, in Example 5, the L-shaped duct in Reference Example 2 was provided with a vibration damping material for suppression of vibration of the duct. Specifically, a vibration damping material "Calmoon Sheet" manufactured by Sekisui Chemical Co., Ltd was cut into a predetermined shape and the vibration damping material was affixed to each of two wide surfaces positioned upstream of the bend position of the duct. At this time, the area of each vibration damping material was the same as the area of each of the two surfaces to which the vibration damping material was affixed. That is, the vibration damping material was affixed to the entire surface of a plate material constituting each of the two surfaces.

Figure 19:
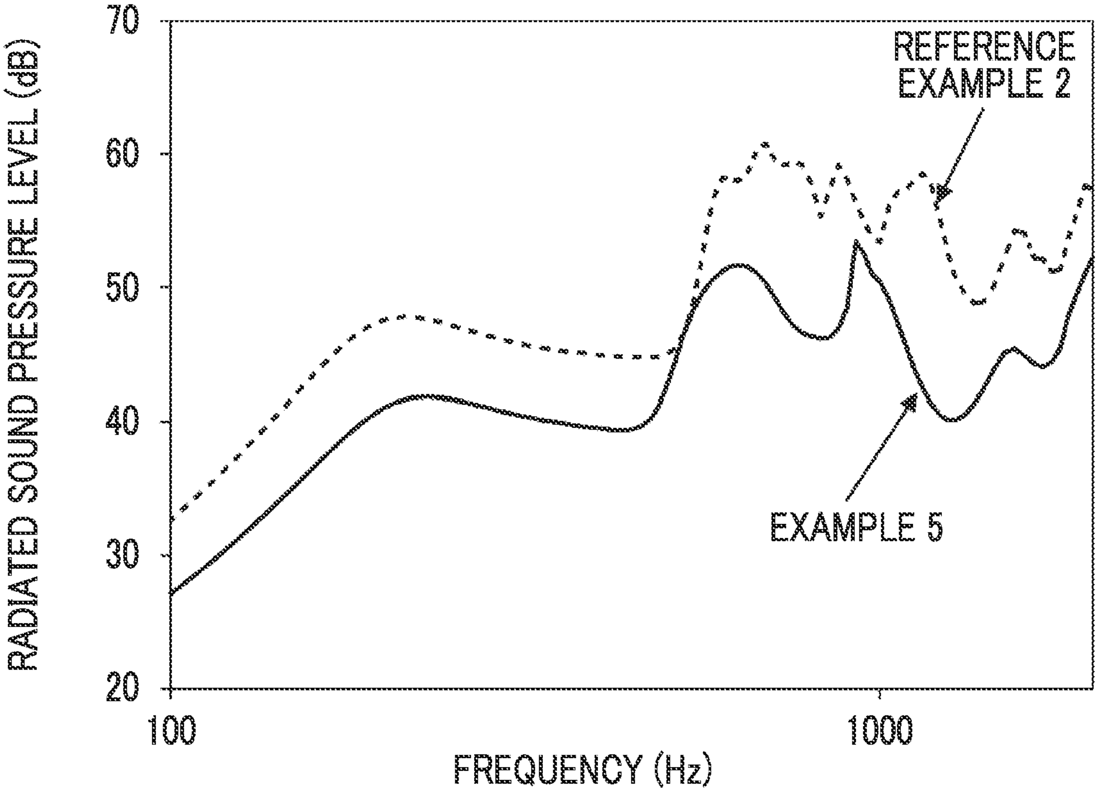
FIG. 19 is a graph showing the result of measurement on a radiated sound from a duct in Example 5.

Then, the acoustic power level (the radiated sound pressure level) of a sound radiated from the duct was measured following the same procedure as in Reference Example 2. FIG. 19 shows the result of the measurement.

As can be understood from FIG. 19, in comparison with Comparative Example 2 in which only the sound absorbing material was used, the amount of sound attenuation was great on a band on the low frequency side including a radiated sound (that is, a radiated sound resulting from vibration of the duct housing) which is maximized in the vicinity of 700 Hz. The above-described fact reflects that, the radiated sound from the duct was dominant regarding a vibration sound of the housing in the band on the low frequency side as already described in the section of Reference Example 2. In addition, in the case of the duct of Example 5, the vibration damping material was attached to a position upstream of the bend position based on a fact that a position where the amount of vibration displacement is made large due to sound interference is positioned upstream of the bend position. Accordingly, it was possible to effectively attenuate a low-frequency vibration sound.

Example 6

Figure 20:
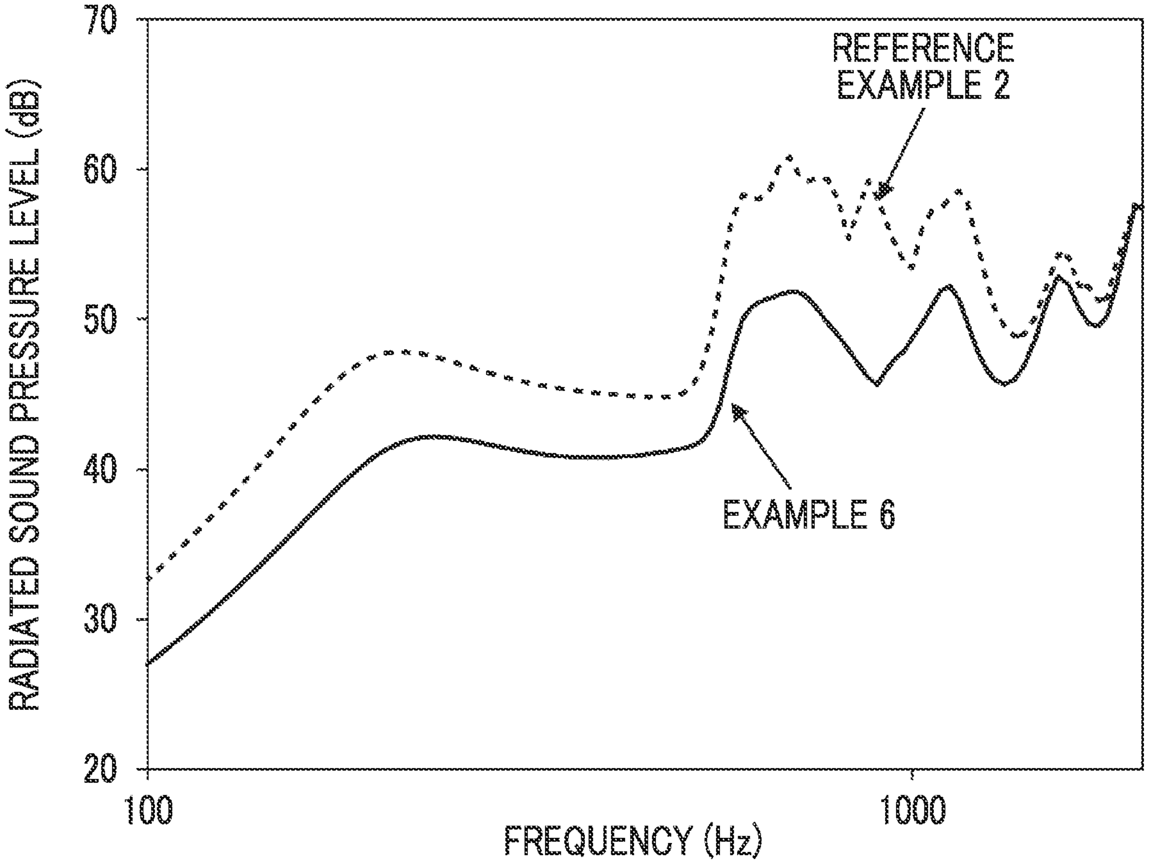
FIG. 20 is a graph showing the result of measurement on a radiated sound from a duct in Example 6.

In Example 6, the sound absorbing material was removed from the duct used in Example 5, and the vibration damping material "Calmoon Sheet" was affixed to a position upstream of the bend position of the duct. Then, the acoustic power level (the radiated sound pressure level) of a sound radiated from the duct was measured following the same procedure as in Reference Example 2. FIG. 20 shows the result of the measurement.

As can be understood from FIG. 20, with the vibration damping effect of the vibration damping material, it was possible to attenuate a sound over the entire band on the low frequency side without using a sound absorbing material.

Comparative Example 3

Figure 21:
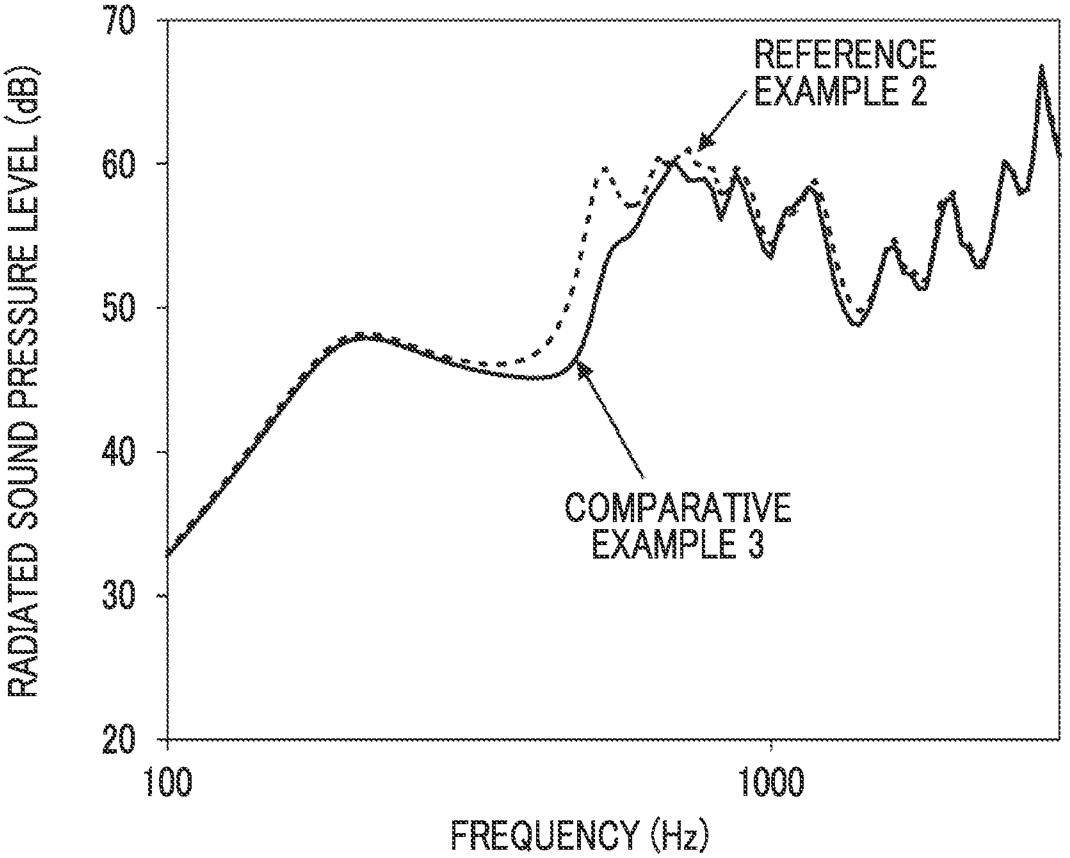
FIG. 21 is a graph showing the result of measurement on a radiated sound from a duct in Comparative Example 3.

In Comparative Example 3, the sound absorbing material was removed in the same manner as in Example 6. In addition, in Comparative Example 3, the vibration damping material attached upstream of the bend position in Example 6 was removed and a vibration damping material was attached to the entire surface of the duct housing (the plate material) position downstream of the bend position instead. Then, the acoustic power level of a sound radiated from the duct was measured following the same procedure as in Reference Example 2. FIG. 21 shows the result of the measurement.

As can be understood from FIG. 21, there was slight sound attenuation on the low frequency side and in comparison with Example 6, the width of a frequency band at which sound attenuation was possible was very small.

Example 7

In Example 7, the duct structure of Example 6 was used as a base. In addition, in Example 7, although the "Calmoon sheet" as a vibration damping material was affixed to the duct housing (the plate material) positioned upstream of the bend position, the vibration damping material was affixed only to a portion of the surface thereof. Specifically, the "Calmoon sheet" was cut into an oblong shape having a size of 30 mm×100 mm and the "Calmoon sheet" was affixed to each of two surfaces of the duct housing that were positioned upstream of the bend position.

Specifically, the central position of the "Calmoon sheet" in the lateral width direction was caused to coincide with the central position of the duct in the lateral width direction. In addition, the "Calmoon sheet" was set such that an end of the "Calmoon sheet" was positioned at a position offset from the bend position by 2 mm, the position being positioned upstream of the bend position in a direction in which the duct extended. The size of the vibrating portion of the duct, that is, the housing (the plate material) to which the "Calmoon sheet" was affixed was 60 mm×180 mm as seen in a plan view. Therefore, in Example 7, the "Calmoon sheet" was affixed to a region corresponding to 27.8% of the area of the entire plate material surface.

Figure 22:
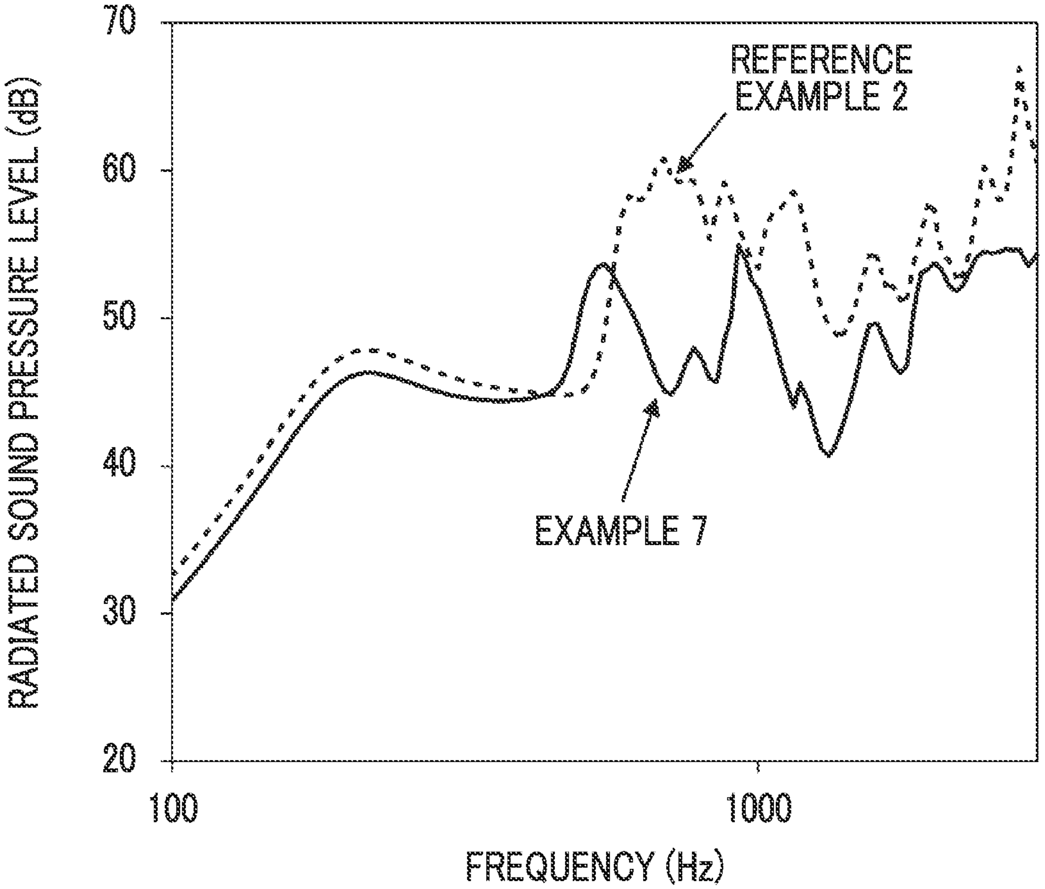
FIG. 22 is a graph showing the result of measurement on a radiated sound from a duct in Example 7.

Then, the acoustic power level (the radiated sound pressure level) of a sound radiated from the duct was measured following the same procedure as in Reference Example 2. FIG. 22 shows the result of the measurement.

As can be understood from FIG. 22, even in a configuration in which the vibration damping material was affixed only to a portion of the plate material surface, it was possible to sufficiently reduce the radiated sound on the low frequency side attributable to the vibration of the duct housing.

In addition, in Example 7, the natural frequencies of the duct housing (the plate material) were 700 Hz and 900 Hz, and 12.3 cm and 9.5 cm were ¼ times (λ/4) the wavelengths of sounds respectively corresponding to the natural frequencies. Here, since the bend position was a position 8 cm separated from the outlet (the open end) of the duct, the positions of sound pressure antinodes λ/4 separated from the outlet were in the vicinity of the bend position, specifically, were positions at which the distances from the bend position were 4.3 mm and 1.5 mm. In Example 7, it was speculated that effective vibration damping was achieved at a position with a large amount of vibration displacement and thus a large sound attenuation effect was achieved with respect to a sound resulting from vibration since the vibration damping material was attached in the vicinity of the bend position.

Example 8

Figure 23:
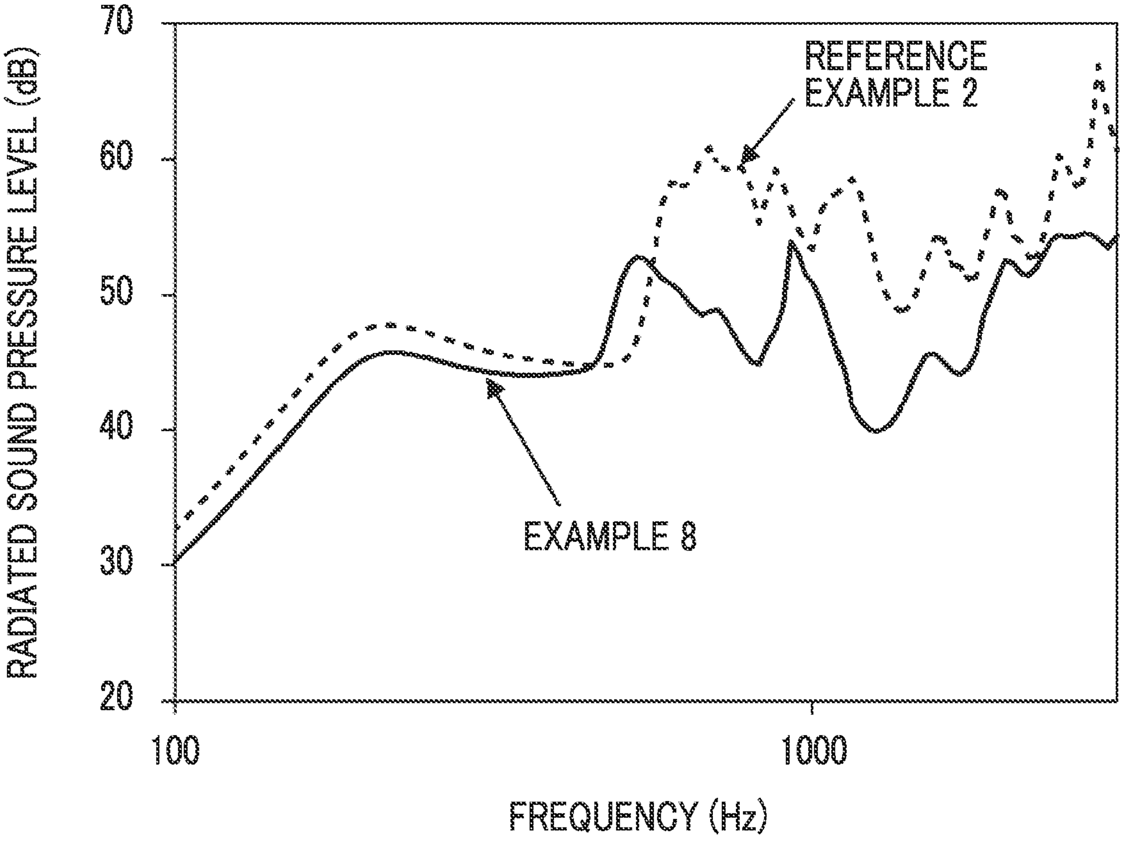
FIG. 23 is a graph showing the result of measurement on a radiated sound from a duct in Example 8.

Example 8 is the same as Example 7 except that the size of the "Calmoon sheet" was set to 30 mm×150 mm. That is, in Example 8, the vibration damping material was attached to a region corresponding to 46.7% of the area of the plate material surface. Then, the acoustic power level (the radiated sound pressure level) of a sound radiated from the duct was measured following the same procedure as in Reference Example 2. FIG. 23 shows the result thereof. As can be understood from FIG. 23, a sufficient sound attenuation effect was also achieved in Example 8.

Table 1 shows the amount of sound attenuation in each of Reference Example 2, Comparative Example 2, and Example 5 to Example 8 in which the L-shaped duct was used. Here, assuming that the total sound volume (dBA) is a value obtained by integrating acoustic power levels, the amount of sound attenuation is represented by a difference from the total sound volume in Reference Example 2.

TABLE 1

| | Reference Example 2 | Comparative Example 2 | Example 5 | Example 6 | Comparative Example 3 | Example 7 | Example 8 |
|---|---|---|---|---|---|---|---|
| Soundproof Structure | None | Sound absorbing material only | Sound absorbing material + vibration damping material provided upstream of bend position | Vibration damping material provided upstream of bend position | Vibration damping material provided downstream of bend position | Sound absorbing material + vibration damping material provided upstream of bend position | Sound absorbing material + vibration damping material provided upstream of bend position |
| Vibration Damping Material Attachment Area | — | — | Entire plate material surface | Entire plate material surface | Entire plate material surface | 28% of plate material surface | 47% of plate material surface |

TABLE 1-continued

| | Reference Example 2 | Comparative Example 2 | Example 5 | Example 6 | Comparative Example 3 | Example 7 | Example 8 |
|---|---|---|---|---|---|---|---|
| Total Sound Volume (dBA) | 64.0 | 62.2 | 56.7 | 59.3 | 62.8 | 59.9 | 57.5 |
| Amount of Sound Attenuation (dB) | | 1.8 | 7.4 | 4.7 | 1.2 | 4.1 | 6.6 |

As shown in Table 1, it has been found that applying the vibration damping material at a position where the distance from the open end of the duct is λ/4, that is, a position upstream of the bend position is important in effectively attenuating a radiated sound from the duct.

As described above, since Examples 1 to 8 of the present invention are within the range of the present invention and relate to a configuration in which the vibration damping material is present within an area at which the distance from the open end is λ/4±λ/8. Therefore, the effect of the present invention is obvious.

EXPLANATION OF REFERENCES

10, 10$x$: ventilation path with soundproof structure
12: ventilation path
14: peripheral wall
16: open end
18: opening portion
20: soundproof structure
22, 22A, 22B, 22C: vibration suppression portion
24: vibration damping material
26: first layer
28: second layer
30: sound absorption unit
32: sound absorbing material
34: covering material
40: rib
I: virtual line
V: vibrating portion

What is claimed is:

1. A ventilation path with a soundproof structure comprising:

the ventilation path includes an open end; and the soundproof structure suppresses a sound emitted from the ventilation path, wherein the soundproof structure includes a vibration suppression portion that is provided on a surface of a peripheral wall surrounding the ventilation path, and assuming that m and n are natural numbers of 4 or less, λ is a wavelength of a sound of which a frequency coincides with an m-th natural frequency of the peripheral wall alone, and L1 is a distance from the open end on a virtual line extending through a central position of a cross section of each portion of the ventilation path, the cross section intersecting a direction in which the ventilation path extends, the vibration suppression portion is present in an area at which the distance L1 satisfies Formula (1), $$(4n-3)/8\times\lambda \leq L1 \leq (4n-1)/8\times\lambda \quad (1).$$

2. The ventilation path with a soundproof structure according to claim 1, wherein at least a portion of the vibration suppression portion is provided on a portion of the surface of the peripheral wall at which the distance L1 is (2n−1)/4×λ.

3. The ventilation path with a soundproof structure according to claim 2, wherein the open end is positioned at an outlet of the ventilation path.

4. The ventilation path with a soundproof structure according to claim 2, wherein the ventilation path is bent, assuming that L2 is a distance from the open end to a bend position of the ventilation path along the virtual line, the distance L2 is less than 5/4×λ, and the vibration suppression portion is provided upstream of the bend position of the ventilation path in a case where an upstream side is a side away from the open end.

5. The ventilation path with a soundproof structure according to claim 2, wherein the vibration suppression portion includes a vibration damping material that is attached to the surface of the peripheral wall.

6. The ventilation path with a soundproof structure according to claim 2, wherein the soundproof structure includes a sound absorption unit disposed between a portion of the ventilation path at which the vibration suppression portion is provided on a peripheral surface of the peripheral wall and the open end.

7. The ventilation path with a soundproof structure according to claim 6, wherein the ventilation path is bent, and the vibration suppression portion is provided upstream of a bend position of the ventilation path and the sound absorption unit is provided downstream of the bend position of the ventilation path in a case where an upstream side is a side away from the open end.

8. The ventilation path with a soundproof structure according to claim 1, wherein the open end is positioned at an outlet of the ventilation path.

9. The ventilation path with a soundproof structure according to claim 1, wherein the ventilation path is bent, assuming that L2 is a distance from the open end to a bend position of the ventilation path along the virtual line, the distance L2 is less than 5/4×λ, and the vibration suppression portion is provided upstream of the bend position of the ventilation path in a case where an upstream side is a side away from the open end.

10. The ventilation path with a soundproof structure according to claim 1, wherein the vibration suppression portion includes a vibration damping material that is attached to the surface of the peripheral wall.

11. The ventilation path with a soundproof structure according to claim 1, wherein the soundproof structure includes a sound absorption unit disposed between a portion of the ventilation path at which the vibration suppression portion is provided on a peripheral surface of the peripheral wall and the open end.

12. The ventilation path with a soundproof structure according to claim 11, wherein the ventilation path is bent, and the vibration suppression portion is provided upstream of a bend position of the ventilation path and the sound absorption unit is provided downstream of the bend position of the ventilation path in a case where an upstream side is a side away from the open end.

13. The ventilation path with a soundproof structure according to claim 11, wherein the sound absorption unit includes a sound absorbing material disposed at a position adjacent to the ventilation path, a surface of the sound absorbing material that faces a ventilation path side is exposed to the ventilation path, and the soundproof structure includes a covering material that covers a surface of the sound absorbing material other than the surface facing the ventilation path side.

14. The ventilation path with a soundproof structure according to claim 1, wherein a portion of the surface of the peripheral wall at which an amount of displacement is largest in a case of vibration at the m-th natural frequency of the peripheral wall alone is provided with the vibration suppression portion.

15. The ventilation path with a soundproof structure according to claim 14, wherein the m-th natural frequency of the peripheral wall alone is a first natural frequency of the peripheral wall alone.

16. The ventilation path with a soundproof structure according to claim 14, wherein, in a case where a plurality of natural numbers correspond to the natural number m, the area at which the distance L1 satisfies Formula (1) is determined for each of the plurality of natural numbers, and the vibration suppression portion is provided in each of the areas respectively determined for the plurality of natural numbers.

17. The ventilation path with a soundproof structure according to claim 1, wherein, assuming that fa is the m-th natural frequency of the peripheral wall alone and fb is the m-th natural frequency of the peripheral wall with the vibration suppression portion provided on the surface, Formula (2) is satisfied, $$0.8 \leq fa/fb \leq 1.25 \quad (2).$$

18. The ventilation path with a soundproof structure according to claim 1, wherein the vibration suppression portion is attached to a portion of an outer peripheral surface of the peripheral wall.

19. The ventilation path with a soundproof structure according to claim 18, wherein the vibration suppression portion is a laminate of two or more layers including a layer consisting of a vibration damping material and a layer consisting of a blocking plate against vibration.

20. The ventilation path with a soundproof structure according to claim 1, wherein the vibration suppression portion is a laminate of two layers, and the laminate includes a first layer consisting of a metal plate and a second layer including a pressure-sensitive adhesive and a vibration damping material, and is attached to the surface of the peripheral wall via the second layer.

* * * * *